United States Patent [19]
Ikegawa

[11] Patent Number: 5,386,329
[45] Date of Patent: Jan. 31, 1995

[54] TAPE CASSETTE LOADING SYSTEM

[75] Inventor: Masaki Ikegawa, Kawasaki, Japan

[73] Assignee: Victor Company of Japan, Ltd., Kanagawa, Japan

[21] Appl. No.: 947,768

[22] Filed: Sep. 18, 1992

[30] Foreign Application Priority Data

Sep. 20, 1991 [JP] Japan ............................ 3-084413[U]
Sep. 30, 1991 [JP] Japan ................................ 3-278296
Sep. 30, 1991 [JP] Japan ................................ 3-278306

[51] Int. Cl.⁶ ..................... G11B 5/008; G11B 15/675
[52] U.S. Cl. ........................................ 360/94; 360/95; 360/96.5
[58] Field of Search .................. 360/85, 94, 95, 96.5

[56] References Cited

U.S. PATENT DOCUMENTS

| | | | |
|---|---|---|---|
| 4,991,043 | 2/1991 | Harumatsu et al. | 360/94 |
| 5,012,364 | 4/1991 | Hirayama et al. | 360/94 |
| 5,025,331 | 6/1991 | Hirayama et al. | 360/85 |
| 5,032,939 | 7/1991 | Mihara et al. | 360/94 |
| 5,046,169 | 9/1991 | Tsujino | 360/96.5 |
| 5,067,036 | 11/1991 | Ozawa | 360/96.5 |
| 5,121,271 | 6/1992 | Sakumoto et al. | 360/94 |
| 5,184,261 | 2/1993 | Noguchi | 360/94 |
| 5,196,972 | 3/1993 | Matsuman et al. | 360/94 |
| 5,237,470 | 8/1993 | Sasaki et al. | 360/94 |

FOREIGN PATENT DOCUMENTS 03171461 7/1991 Japan .
03181053 8/1991 Japan .
03283128 12/1991 Japan .

Primary Examiner—Stuart S. Levy
Assistant Examiner—Paul J. Ditmyer
Attorney, Agent, or Firm—Michael N. Meller

[57] ABSTRACT

The specification discloses a tape cassette loading system equipped in a magnetic recording and/or reproducing apparatus for loading a standard tape cassette or a small tape cassette which is smaller than the standard tape cassette into the apparatus. The tape cassette loading system includes a cassette holder slidably provided for holding the standard or the small tape cassette therein, a cassette holder driving mechanism for transferring the cassette holder to predetermined positions, a door mechanism comprising a door portion having first and second doors provided for selectively permitting insertion of the standard or the small tape cassette to the cassette holder and a door stopper mechanism for preventing the first and second doors from opening, a cassette holder positioning device for selectively positioning the cassette holder to the first or the second mounting and taking-out position correspondingly with the insertion of the standard or the small tape cassette, and a cassette positioning device provided on a chassis base for positioning the standard or the small tape cassette in the first or the second cassette holding position where loading poles of the apparatus are positioned at the first or the second loading start position correspondingly with the first or the second cassette holding position.

1 Claim, 14 Drawing Sheets

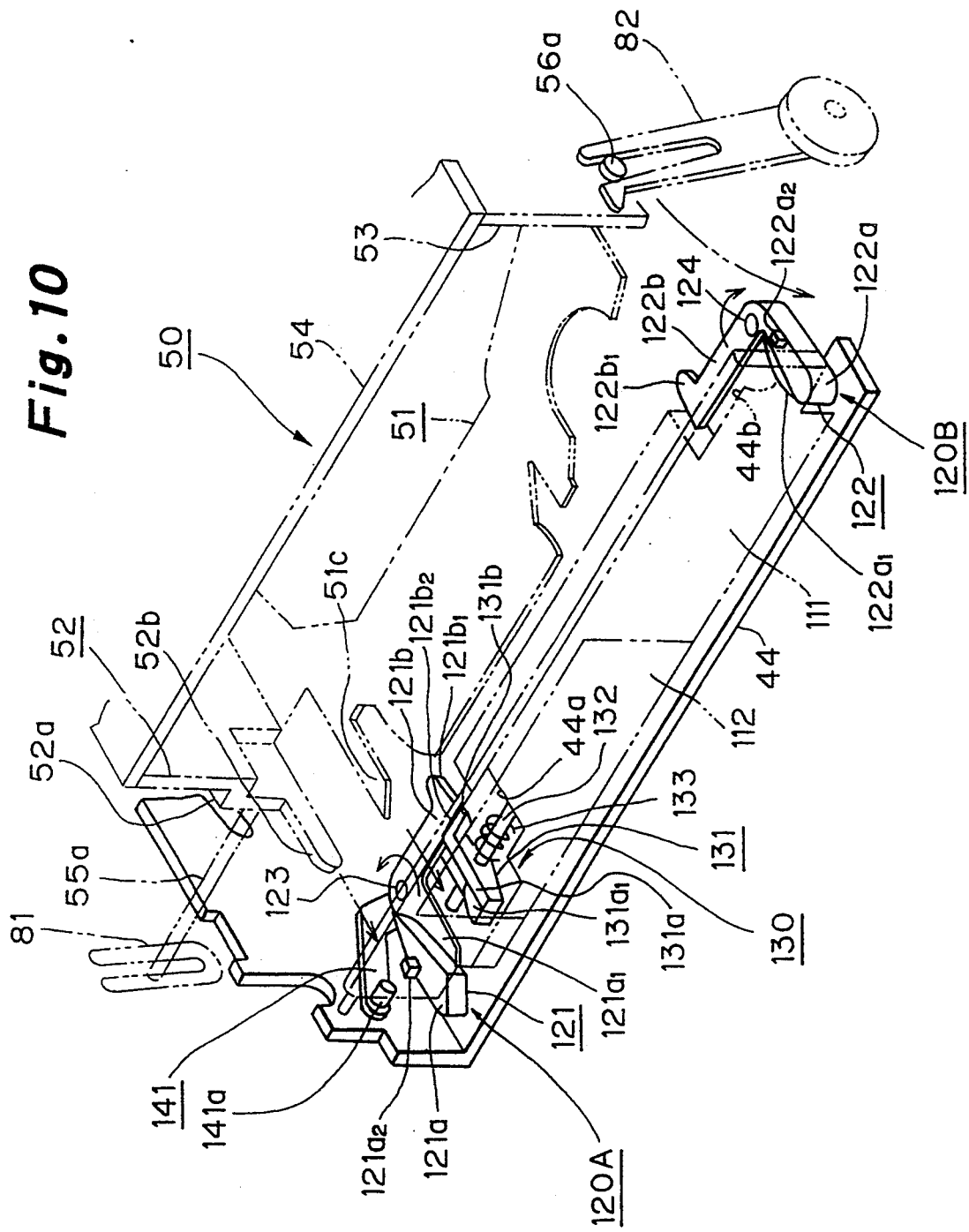

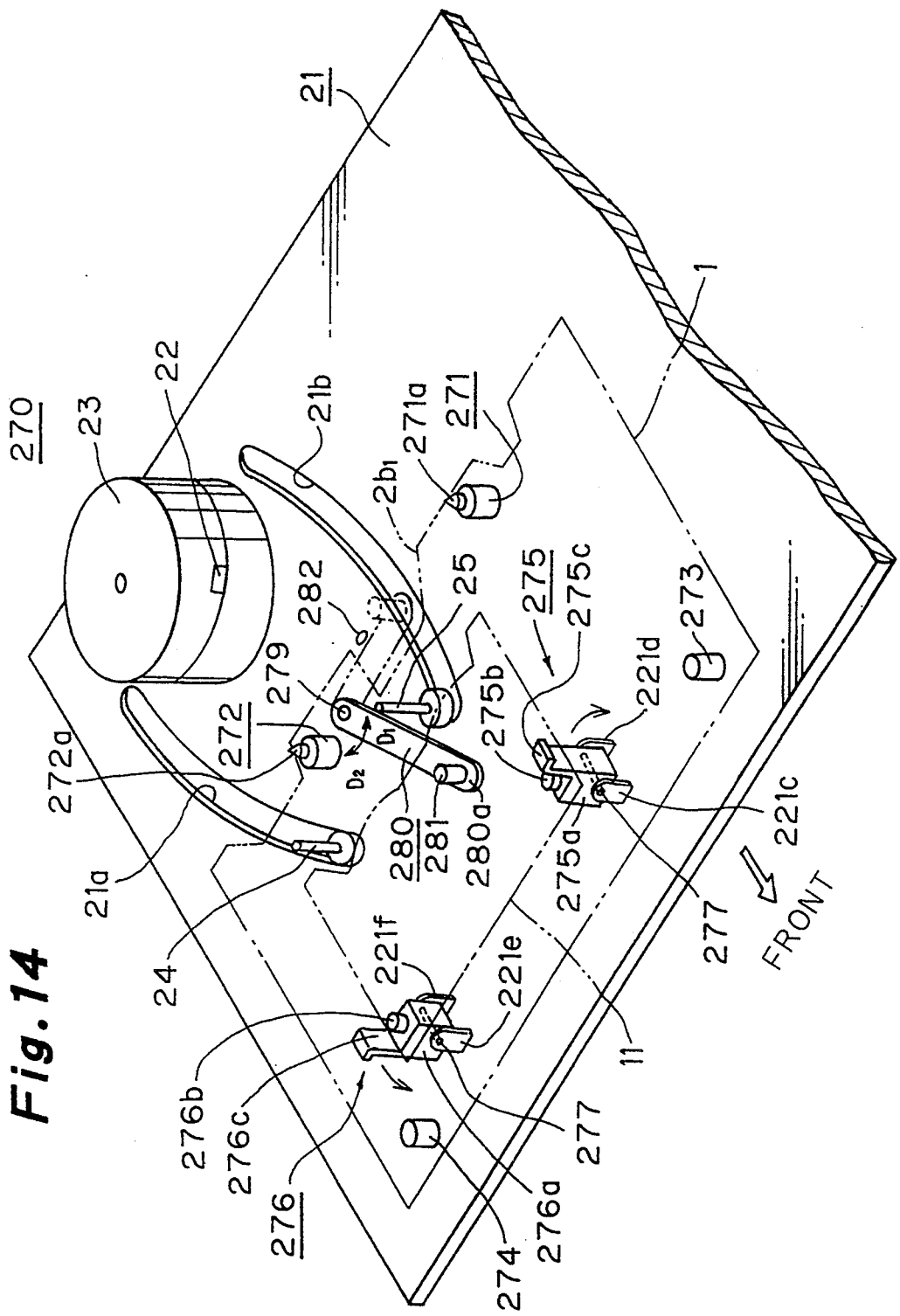

TAPE CASSETTE LOADING SYSTEM

BACKGROUND OF THE INVENTION

1. Field of the Invention

The present invention relates to improvements of a tape cassette loading system equipped in a magnetic recording and/or reproducing apparatus (apparatus), for loading a standard tape cassette or a small (size) tape cassette into a cassette holder and for transferring the cassette to a predetermined cassette holding position in the apparatus, and it particularly relates to a tape cassette loading system capable of loading securely the small sized tape cassette into the cassette holder and for transferring the small tape cassette to the predetermined cassette set position.

2. Description of the Related Art

Presently, a magnetic recording and/or reproducing apparatus employing a front loading system is widely used in, for instance, a Video Tape Recorder (VTR) because of an excellent maneuverability of a cassette accommodating a magnetic tape upon loading it into a cassette holder of the apparatus.

Among the apparatuses employing the front loading system, there is an apparatus which is constructed so as to be selectively loaded with either a standard tape cassette (e.g. VHS Tape Cassette) or a small (size) tape cassette (e.g. VHS Compact Tape Cassette) which is smaller than the standard tape cassette. For instance, in the Japanese Patent Laid Open Publication No. 3160/1983, there disclosed a prior art using an adapter for the small cassette. Upon loading the small tape cassette into the apparatus, the small tape cassette is mounted in the adapter in such a manner that the same tape path as the standard tape cassette has is preliminary formed within the adapter, and the adapter accommodating the small tape cassette is then loaded into the cassette holder (for standard size cassette) of the apparatus.

Further, as another prior art using no adapter, another magnetic recording and/or reproducing apparatus has been proposed by the present applicant in the Japanese Patent Laid Open Publication No. 171461/1991.

FIG. 1 is a perspective view showing a magnetic recording and/or reproducing apparatus of the prior art.

Referring to FIG. 1, a cassette tray 301 is slidably provided at a front panel side in a apparatus 300. The standard tape cassette 302 or the small tape cassette 303 is selectively mounted at a respective predetermined position on the tray, and is automatically transferred to a predetermined cassette holding position by a transferring operation of the cassette tray 301 driven by a tray transfer mechanism (not shown ), while a front lid (not shown) of the standard tape cassette 302 or the small tape cassette is swung upward to open by a lid opening mechanism. FIG. 2 is a plan view showing the loading mechanism of the apparatus 300 in the prior art.

Next, the description will be given to a loading operation of the tape cassette, for instance, the small tape cassette 303 referring to FIG. 2. A segment of magnetic tape T being extended between a pair of tape reels 303a, 303b is positioned just behind the front lid (not shown) with its closed position. Thus, upon the tape loading, a pair of loading poles 304, 305 enter into a mouth provided at a bottom of the small tape cassette 303 to intercept and engage with the tape segment T to draw it out of the small tape cassette 303 with its lid being open, subsequently, the loading poles 304, 305 move respectively to predetermined positions along guides groove 306a, 306b provided on a chassis base 306 so as to bring the magnetic tape obliquely around a rotary head drum 307 in a predetermined range. Then, recording or reproducing of signals on or from the magnetic tape is performed by rotary magnetic heads fixed to the rotary head drum 307.

As shown in FIG. 2, the cassette holding position of the standard tape cassette 302 is different from that of the small cassette 303. However, the loading poles 304, 305 can move to a different loading start position correspondingly with the cassette set position of the standard tape cassette 302 or the small cassette 303.

Furthermore, as another prior art using no adapter and no cassette tray, another magnetic recording and/or reproducing apparatus has been proposed by the present assignee in the Japanese Patent Laid Open Publication No. 181053/1991 and in the Japanese Patent Laid Open Publication No. 283128/1991, wherein such a double door mechanism is disclosed as the standard tape cassette 302 is directly mounted to a cassette holder through a front door which has also an opening for permitting an insertion of the small cassette and a second door rotatably provided at the front door for covering the opening, thus, the small cassette can be mounted through the second door in the cassette holder. After one of the tape cassettes is mounted, the cassette holder is transferred to a first cassette holding position for the the standard tape cassette or a second cassette set position for the small tape cassette where the loading poles are selectively waiting correspondingly with the first cassette holding position or the second cassette set position.

In the foregoing prior art (3160/1983) using the adapter, either of the standard tape cassette or the small tape cassette is usable in the same apparatus, however, there is a drawback of requiring the adapter when the small tape cassette is used.

In another prior art (171461/1991) as shown in FIGS. 1 and 2, either of the standard tape cassette or the small tape cassette is usable without using the adapter for the same apparatus, however, there is a problem that the apparatus requires a large moving area for the cassette tray which moves in and out of the apparatus.

In other prior arts(181053/1991, 283128/1991), the above drawback and problem are eliminated because of the double door mechanism which is used without the adapter or the large cassette tray, however, the double door apparatus still requires some improvements on the loading mechanism because of lack of stability when the small tape cassette is loaded in the apparatus, and because of complexity of the positioning mechanism provided in the cassette holder for securing the small tape cassette in position when it is mounted in the cassette holder.

SUMMARY OF THE INVENTION

A general object of the present invention is to provide a novel and useful tape cassette loading system in which the above problems have been eliminated.

A more specific object of the present invention is to provide an improved tape cassette loading system regarding a tape cassette loading system for selectively mounting and taking out one of a standard tape cassette and a small tape cassette which is smaller than the standard tape cassette in and from a cassette holder having a ceiling and a bottom, through a cassette insertion inlet and for selectively transferring one of the standard tape cassette and the small tape cassette to one of a first cassette holding position and a second cassette set position, by transferring the cassette holder respectively from a first mounting taking-out position for the standard tape cassette and a second mounting and taking-out position for the small tape cassette, whereby loading means slidably provided on a chassis basis is selectively positioned at one of a first loading start position and a second loading start position correspondingly with the first cassette holding position and the second cassette holding position.

A further object of the present invention is to provide a tape cassette loading system comprising a shaft provided near the cassette insertion inlet, a first door rotatably provided on the shaft for coverring the cassette insertion inlet and permitting an insertion of the standard tape cassette into the cassette holder, the first door having an opening and first guide portions provided at both side walls of the opening for permitting and guiding an insertion of the small tape cassette, a second door rotatably provided on the shaft means behind the opening for covering the opening and permitting the insertion of the small tape cassette, the second door being provided with second guide portions immediately behind the first guide portion for guiding the insertion of the small tape cassette, an arm member provided on the ceiling of the cassette holder, the arm member having a pair of arms for guiding the insertion of the small tape cassette therebetween into the second mounting and taking-out position, and an arm member rotating means rotatably provided for retracting the arm member so as to permit the insertion of the standard tape cassette.

A further object of the present invention is to provide a tape cassette loading system comprising an erroneous insertion preventing means provided protrusively backward from said pair of arms therebetween for preventing wrong insertions of the standard tape cassette and the small tape cassette, said erroneous insertion prevention means permitting a normal insertion of the small tape cassette to the cassette holder positioned at the second mounting and taking-out position.

A further object of the present invention is to provide a tape cassette loading system comprising a positioning plate means movably provided under the bottom of the cassette holder correspondingly with the second mounting and taking-out position for restricting the insertion of the small tape cassette, the positioning plate means having positioning portions for positioning the small tape cassette at a predetermined position and engaging means for retracting the positioning portions so as to permit the insertion of the standard tape cassette in the cassette holder by being engaged with the standard tape cassette inserted into the cassette holder.

A further object of the present invention is to provide a tape cassette loading system comprising a cassette selection means for selecting and indicating one of the standard tape cassette and the small tape cassette which is to be mounted in the cassette holder, a cassette holder position switch plate slidably provided nearby the cassette insertion inlet, the cassette holder position switch plate being selectively transferred to one of a first position and a second position correspondingly with the indication of the cassette selection means, first cassette holder positioning means for positioning the cassette holder at the first mounting and taking-out position in cooperation with the cassette holder position switch plate which is positioned at the first position, second cassette holder positioning means for positioning the cassette holder at the second mounting and taking-out position in cooperation with the cassette holder position switch plate which is positioned at the second position, and cassette holder driving means for transferring the cassette holder between the first and second mounting and taking-out positions correspondingly with the first and second positions of the cassette holder position switch plate.

A further object of the present invention is to provide a tape cassette loading system comprising a first positioning pin provided on the chassis base for positioning the standard tape cassette at the first cassette set position by engaging with the first positioning hole of the standard cassette and a second positioning pin movably provided on an area where the standard tape cassette is to be positioned on the chassis base for positioning the small tape cassette at a second cassette holding position by engaging with the second positioning hole of the small tape cassette, whereby the second positioning pin being retracted from the area so as to permit an insertion of the standard tape cassette.

Other objects and further features of the present invention will be apparent from the following detailed description when read in conjunction with the accompanying drawings.

BRIEF DESCRIPTION OF THE DRAWINGS

Preferred embodiments of the present invention will be described with reference to the accompanying drawings wherein:

FIG. 10 is a perspective view showing a first door stopper and a second door stopper for stopping a first door and a second door.

FIG. 14 is a perspective view showing a cassette positioning device.

DETAILED DESCRIPTION OF THE PREFERRED EMBODIMENT

The detailed description will be given to each of the following items, i.e., "a standard tape cassette and a small cassette", "a tape cassette loading system" and "an operation of the tape cassette loading system" in order, referring FIGS. 3 through 13.

A standard tape cassette and a small tape cassette

Figure 1:
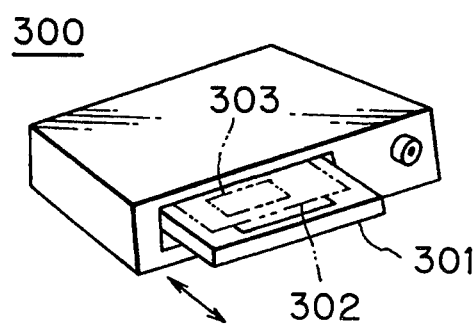
FIG. 1 is a perspective view showing a magnetic recording and/or reproducing apparatus of a prior art.
Figure 2:
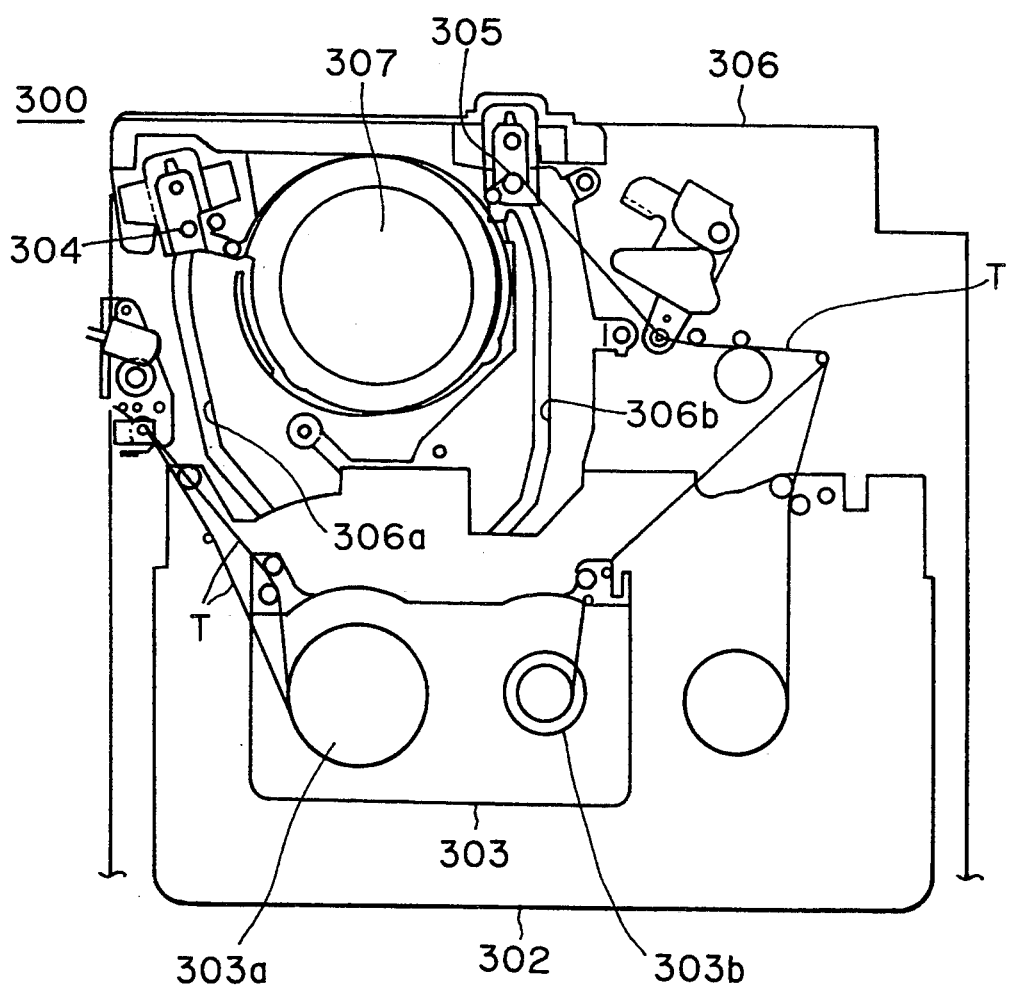
FIG. 2 is a plan view showing a loading mechanism of the apparatus in a prior art.
Figure 3A:
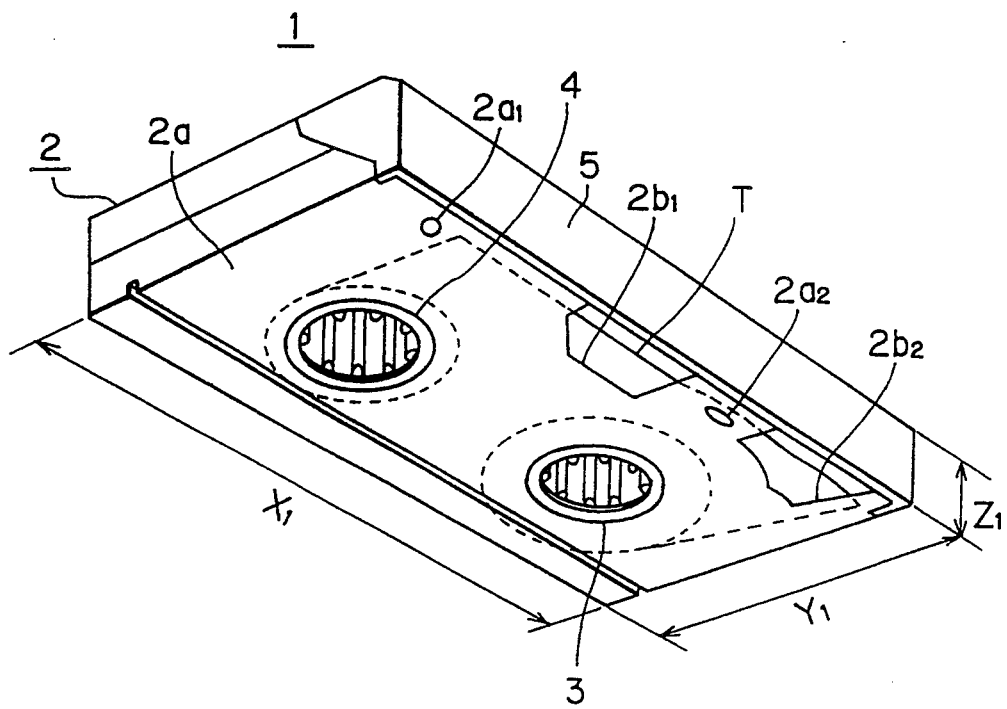
FIG. 3A is a perspective view showing a standard tape cassette.
Figure 3B:
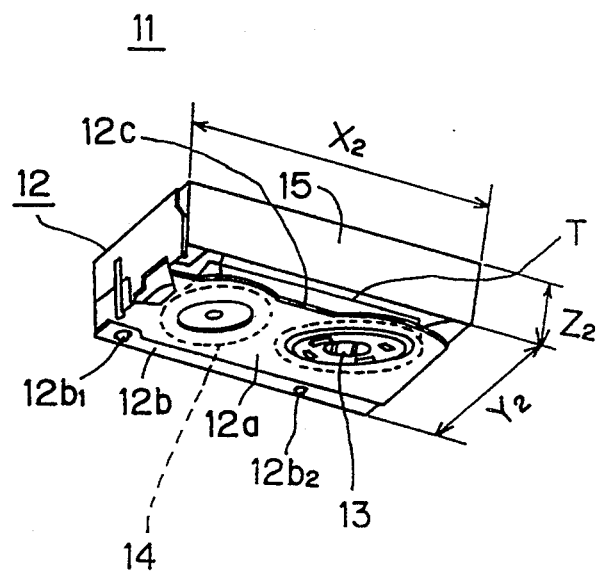
FIG. 3B is a perspective view showing a small tape cassette used in an embodiment of the present invention.

FIG. 3A is a perspective view showing a standard tape cassette and FIG. 3B is a perspective view showing a small cassette both used in prior arts an embodiment of the present invention.

Prior to the description of an embodiment of a tape cassette loading system of the present invention, the description is given to a standard tape cassette 1 and a small (size) tape cassette 11, referring to FIG. 3A and FIG. 3B.

Figure 13A:
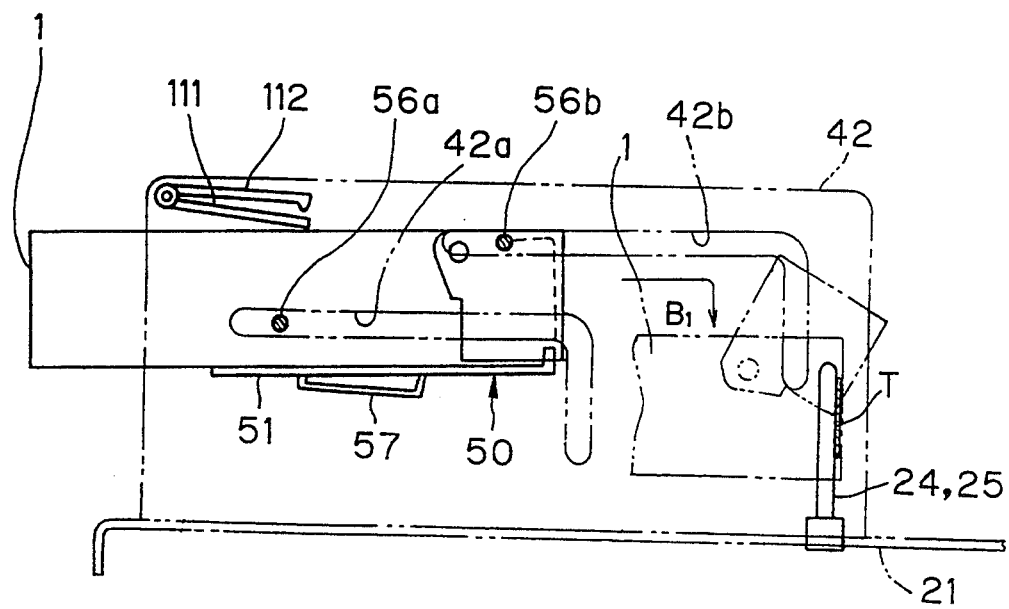
FIG. 13A is a elevation view showing a loading operation of a standard tape cassette.

The standard tape cassette 1 (e.g. a VHS type Tape Cassette) has a large cassette housing 2 made of resin material in a box-like shape of which each size, i.e., $Y_1$ (length)×$X_1$ (width)×$Z_1$ (height) is determined according to an industry standard specification. A supply reel 3 and a take-up reel 4 around which both ends of a magnetic tape T are respectively wound, are accommodated in the large cassette housing 2 in such a manner that the tape segment of the magnetic tape T between the reels 3, 4 forms a predetermined tape path along a back wall of a lid 5 which is rotatably provided at a front of the large cassette housing 2. Positioning holes $2a1$ (round) and $2a2$ (elongated) are provided in the bottom $2a$ of the large cassette housing 2 for securely positioning the large cassette housing 2 to a first cassette holding position on a chassis base 21 as will be described hereafter referring to FIG. 13A. Further, there provided in the bottom $2a$ openings $2b1$ and $2b2$ through which loading poles 24, 25 are inserted to engage with the tape segment of the magnetic tape T as illustrated in FIG. 13A.

Figure 13B:
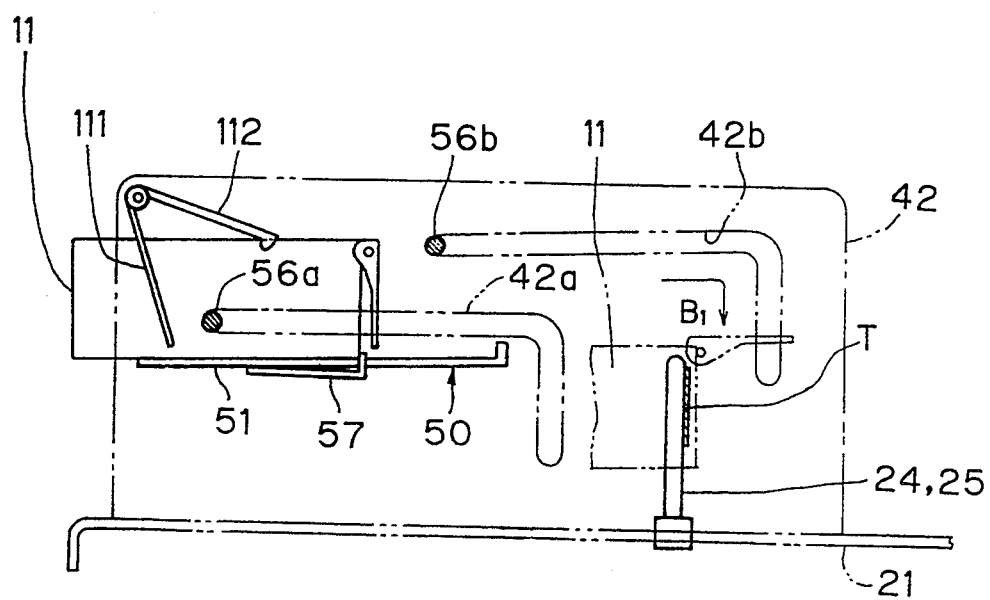
FIG. 13B is a elevation view showing a loading operation of a small tape cassette.

On the other hand, as shown in FIG. 3B, a small cassette 11 ( e.g. VHS Compact type Tape Cassette) has a small tape cassette housing 12 made of resin material in a box-like shape of which each size ,i.e., $Y_2$ (length)×$X_2$ (width)×$Z_2$ (height) is smaller than that of the large cassette housing 2 so that the small tape cassette 11 can be accommodated in a cassette adapter(not shown) having the same exterior size as the standard tape cassette 1 has, though a magnetic tape T used in the small tape cassette has the same width as the standard tape cassette has. Similar to the foregoing standard tape cassette 1, a supply reel 13 and a take-up reel 14 around which both ends of a magnetic tape T are respectively wound, are accommodated in the small cassette housing 12 in such a manner that the tape segment of the magnetic tape T between the reels 13, 14 forms a predetermined tape path along a back wall of a lid 15 which is rotatably provided to a front of the small tape cassette housing 12. Positioning holes $12b1$ (round) and $12b2$ (elongated) are provided in the bottom $12a$ of the small cassette housing 12 for securely positioning the small cassette housing 12 at a second cassette holding position on a chassis base 21 of the apparatus as will be described hereafter referring to FIG. 13B. Further, there provided in the bottom $12a$ an opening $12c$ through which loading poles 24, 25 are inserted to engage with the tape segment of the magnetic tape T as illustrated in FIG. 13B.

Tape Cassette Loading System

Next, the description is given to an overall structure of a tape cassette loading system 20 of the present invention.

Figure 4:
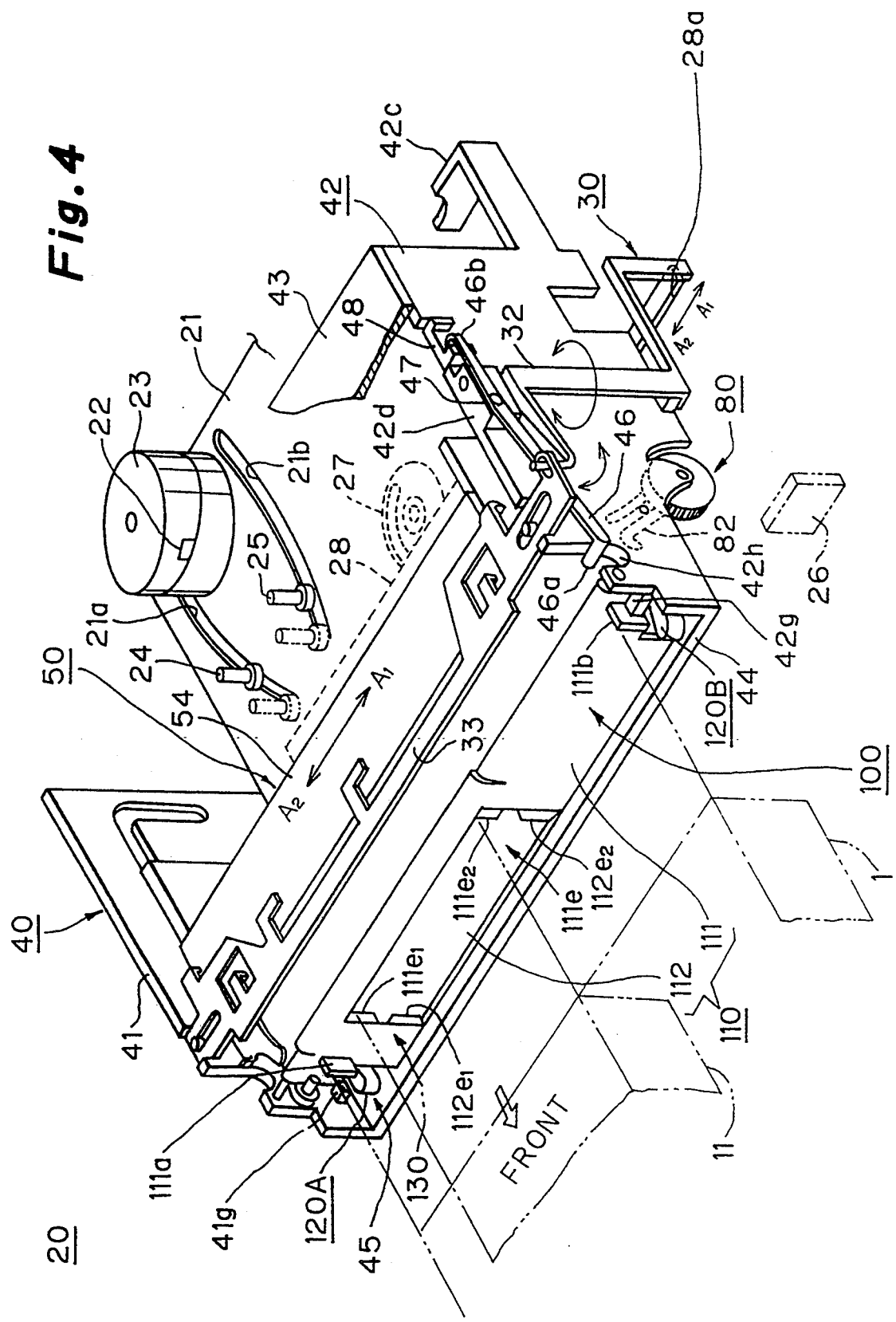
FIG. 4 is a perspective view showing an overall structure of a tape cassette loading system of the present invention.

FIG. 4 is a perspective view showing an overall structure of a tape cassette loading system of the present invention.

Referring to FIG. 4, the numeral 21 designates a chassis base, 23 a rotary drum rotatably provided on the chassis base 21, 22 one of rotary magnetic heads provided on the rotary drum 23, $21a$ and $21b$ guide grooves provided at both sides of the rotary drum 23, which guide grooves $21a$ and $21b$ are directly formed in the chassis base 21 or mounted on the chassis base 21 as a separate parts made of a resin body, 24 and 25 loading poles slidably provided in the guides grooves $21a$, $21b$ for causing the magnetic tape T to wrap obliquely around the rotary drum 23 in a predetermined circumferential range.

A cassette selection switch 26 is provided on a front panel (not shown) for selecting the standard tape cassette or the small tape cassette 11. When one of the indications, "standard type" for the standard tape cassette 1 or "small type" for the small tape cassette 11, is selected by the cassette selection switch 26, a control cam wheel 27 is driven by a driving mechanism (not shown) so that a control plate 28 engaged with the control cam wheel 27 is transferred in the arrow direction A1 or A2. This transfer operation of the control plate 28 transfers the loading poles 24, 25 to a first loading start position (shown as solid lines) or a second loading start position (shown as dot lines) through a connection device (not shown) engaged with the control plate 28. In other wards, when the indication "standard type" is selected by the cassette selection switch 26, the loading poles 24, 25 are transferred to the first loading start position correspondingly with the cassette holding position of the standard tape cassette 11 and when the indication "small type" is selected with the cassette selection switch 26, the loading poles 24, 25 is transferred at the second loading start position correspondingly with the first cassette set position of the small cassette 11. Further detailed technical description for the above operation is given disclosed in the Japanese Patent Laid Open No. 171461/1991.

The numerals 41 and 42 designate a left side panel and a right side panel symmetrically provided at both sides of the chassis base 21. A ceiling panel 43 is provided between the left side panel 41 and the right side panel 42, and a front panel 44 is provided at a front of the cassette loading system between the left side panel 41 and the right side panel 42. These panel members 41 through 44 form a box-like frame body 40. In these panel members 41 through 44, the ceiling panel 43 is made of a sheet metal and the others are made of resin bodies.

A door mechanism 100 for permitting an insertion of the standard tape cassette 1 or the small tape cassette 11 is provided at a front side of the frame body 40 so as to cover a cassette insertion inlet 45. The door mechanism 100 comprises a door portion 110 having a first door 111 and a second door 112, and a first door stoppers 120A, 120B for stopping the first door 111 and a second door 112, which is described hereafter referring to FIG. 8 and FIG. 9.

A cassette holder 50 is slidably provided at a rear portion of the door mechanism 100 for holding the standard tape cassette 1 or the small tape cassette 11, which is mentioned in detail hereafter referring to FIGS. 5 through 7B.

Figure 5:
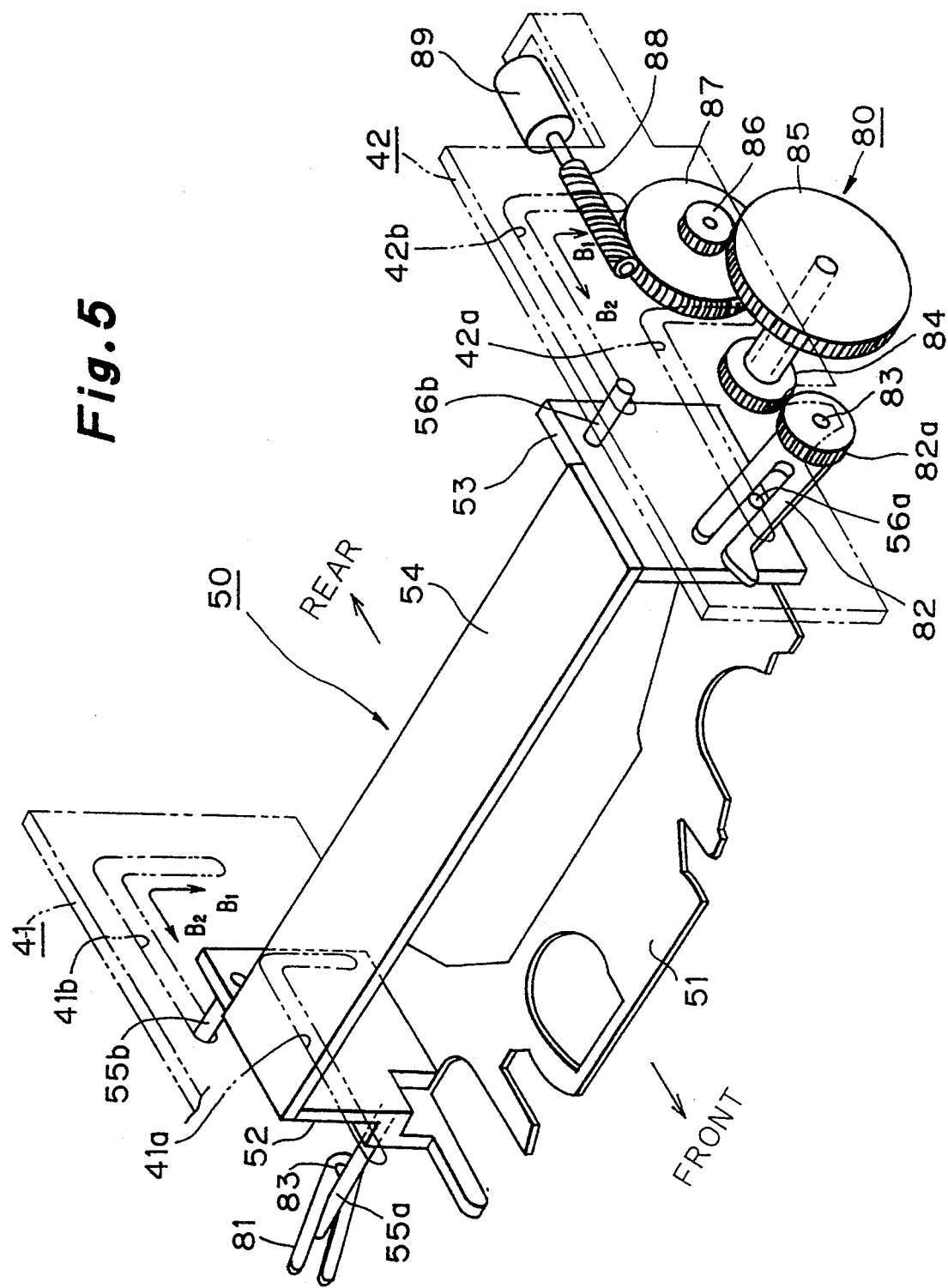
FIG. 5 is a perspective view showing a cassette holder and a cassette holder driving mechanism.

A cassette holder driving mechanism 80 is provided along the side panels 41, 42 for transferring the cassette holder 50 toward the first or second cassette holding position correspondingly with the standard tape cassette 1 or the small tape cassette 11 held in the cassette holder 50, which is mentioned in detail hereafter referring to FIG. 5.

A cassette holder positioning mechanism 30 for selectively positioning the cassette holder 50 to the first mounting and taking-out position for a standard tape cassette 1 or a second mounting and taking-out position for the small tape cassette 11 generally comprises a cassette holder position switch plate 33 provided between the ceiling panel 43 and a holder ceiling panel 54 of the cassette holder 50 and a Z-shaped cassette holder switch lever 32 provided at the side panel 42 of the right side for engaging with the cassette holder position switch plate 33, which is described hereafter referring to FIGS. 7A, 7B. The above first mounting and taking-out position defines a position where the standard tape cassette 1 is mounted or ejected on or from the cassette holder 50. The second mounting and taking-out position defines the same as to the small tape cassette 11.

A cassette loading positioning device 270 shown FIG. 14) is further provided on the chassis base 21 for positioning the standard tape cassette 1 or the small tape cassette 11 at the first cassette holding position or the second cassette holding position, which is described in the item "Operation of the Tape Cassette Loading System" referring to FIGS. 14 through 16B.

It should be noted that the back side or the rotary drum side of the frame body 40 is open to transfer the cassette holder 50 to a predetermined position as mentioned in the foregoing description.

Further, there provided an "L" shaped member 42c at a rear of the right side panel 42 for opening the lid 5 of the standard tape cassette 1, of which operation is well known, so that the description is omitted here.

The foregoing mechanisms 30, 50, 80, 100 (110, 120A, and 120B) and 270 are respectively constructed to operate in cooperation with each other, then, the description will be given to each of the construction of the mechanism together with functions and operations Cassette holder 50 and cassette holder driving mechanism 80.

The door mechanism 100 provided at the front of the frame body 40 operates in different ways correspondingly with the first and second mounting and taking-out positions of the cassette holder 50, then, the description is given to the cassette holder 50 and the cassette holder driving mechanism 80 which transfers the cassette holder 50 from the first or the second cassette mounting and taking-out position to the first or the second cassette set position for causing the standard tape cassette 1 or the small tape cassette 11 to position at the first or second cassette holding position by the cassette loading positioning mechanism 270.

Figure 6:
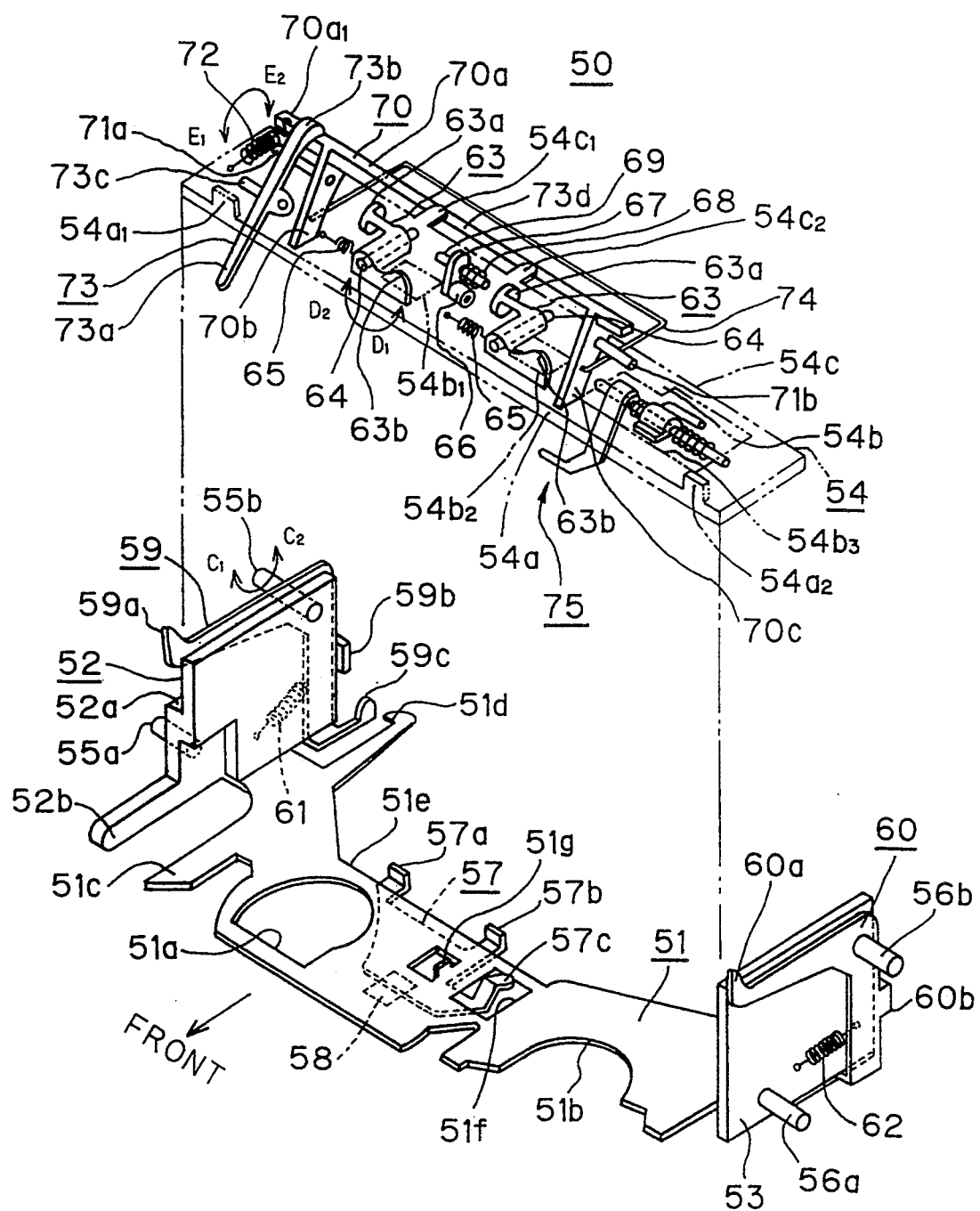
FIG. 6 is an enlarged perspective view showing the cassette holder with a ceiling plate removed.
Figure 7:
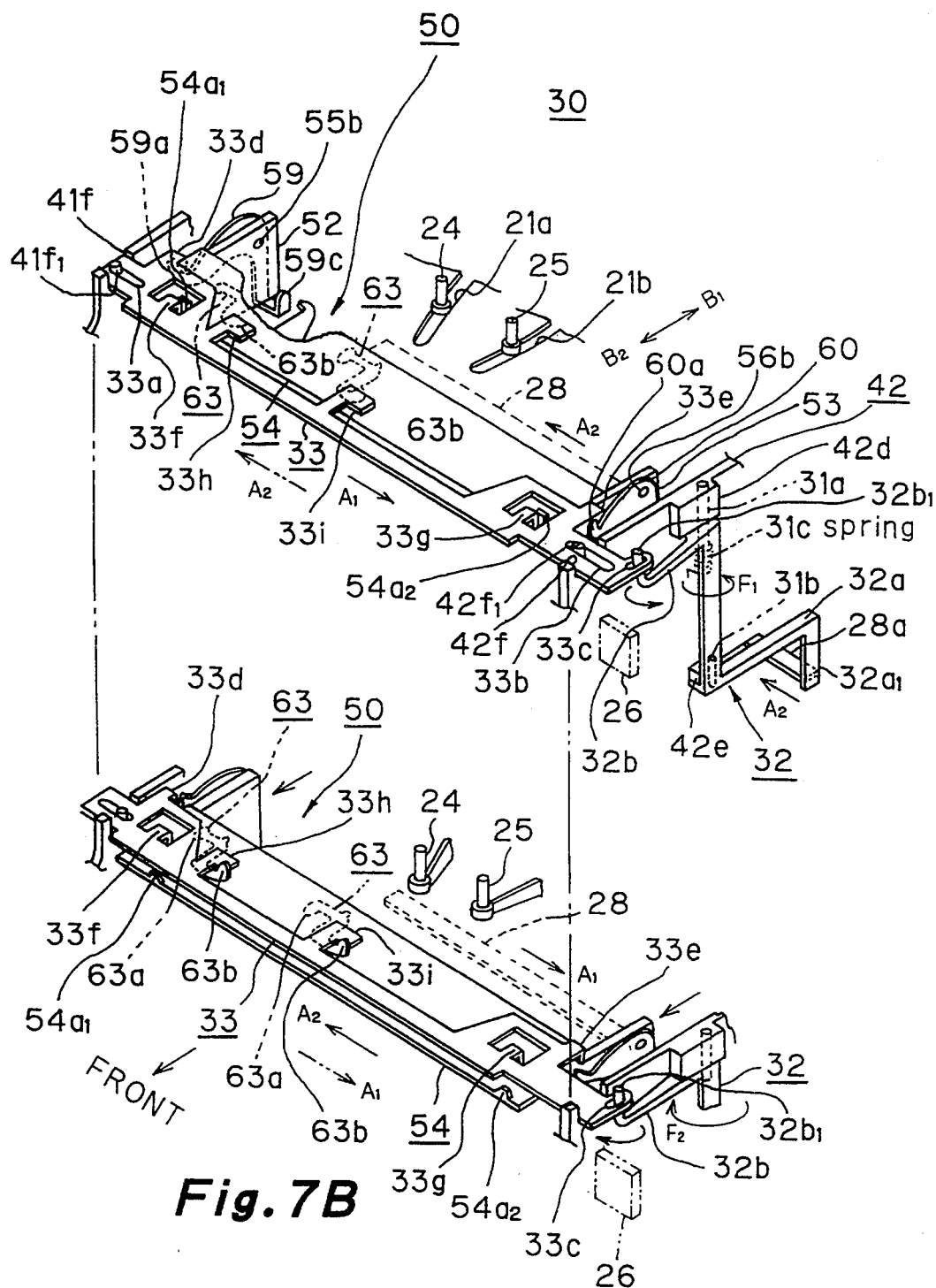
FIG. 7A is a perspective view showing a cassette holder positioning mechanism and showing a state where the cassette holder positioning mechanism is placed at a first mounting and taking-out position for the standard tape cassette.
FIG. 7B is a perspective view showing a cassette holder positioning mechanism and showing a state where the cassette holder positioning mechanism is placed at a second mounting and taking-out position for the small tape cassette.

FIG. 5 is a perspective view showing the cassette holder and the cassette holder driving mechanism. FIG. 6 is an enlarged perspective view showing the cassette holder 50 with the ceiling panel removed As shown in FIG. 5, the cassette holder 50 comprises a holder bottom panel 51, holder side panels 52, 53 provided at both sides of the bottom panel 51, and a holder ceiling panel 54, and these panel members 51 through 54 forms a box-like frame having openings at both front and rear thereof. Functional members provided on the panel members 51 through 54 will be described hereafter referring to FIG. 6. The left and right holder side panels 52, 53, are symmetrically provided at the sides of the holder bottom panel 51 facing each other. Further, guide pins 55a, 55b and 56a, 56b are protrusively provided outwardly on the left and right holder side panels 52, 53, respectively, and are slidably engaged with L-shaped grooves 41a, 41b and 42a, 42b of the left and right side panels 41, 42, respectively.

Further, referring to FIG. 5 again, the cassette holder driving mechanism 80 is provided at the right side panel 42 to transfer the cassette holder 50 in the arrow direction B1 and B2 along L shaped grooves 41a, 41b, and 42a, 42b.

In the cassette holder driving mechanism 80, bifurcated arms 81 and 82 are respectively provided at both ends of a long shaft 83 which is extended under the holder bottom panel 51 in such a manner that bifurcated arms 81 and 82 are moved synchronously the same phase, and are respectively slidably engaged with guide pins 55a and 56a provided on the left and right holder side panels 52 and 53. The bifurcated arm 81 at the left side is provided at an outside of the left side panel 41, on the other hand, the bifurcated arm 82 at the right side is provided at an inside of the right side panel 42. Further, a gear portion 82a is provided on the shaft 83 or the bifurcated arm 82 in such a manner that the gear portion 82a protrudes outwardly from the right side panel 42. Furthermore, the gear portion 82a is engaged with a gear train 84 through 87 which is further engaged with a worm gear 88 driven by a motor 89.

When the motor 89 roates, it causes the gear portion 82a to rotate through the gear train 84 through 87. Then, the cassette holder 50 is transferred in the arrow direction B1 or B2 along the L-shaped grooves 41a, 41b, 42a, and 42b correspondingly with the clockwise rotation or counter-clockwise rotation of the bifurcated arms 81 and 82, so that the standard tape cassette 1 or the small tape cassette 11 mounted in the cassette holder 50 can be transferred to the first or the second cassette holding position as described hereafter.

Next, a detailed description is given to the cassette holder 50, referring to FIG. 6.

As shown in FIG. 6, the holder bottom panel 51 made of a sheet metal comprises an aperture 51a provided correspondingly with the supply reels 3, 13 of the standard tape cassette 1 and the small tape cassette 11 for permitting an insertion of a reel driving shaft (not shown) of the apparatus, a cut out 51b provided correspondingly with the take-up reel 4 of the standard tape cassette 1 for permitting an insertion of another reel driving shaft (not shown) of the apparatus, projection 51c provided at a front left area of the holder bottom panel 51 for disengaging the second door 112 from a second door stopper 130 of a second door potion 112 (described hereafter referring to FIG. 4, FIG. 10 and FIG. 12), a pair of hooks 51d, 51d (shown only with the left side one) respectively provided at both left and right side of a rear end for restricting the insertion of the standard tape cassette 1, and a positioning plate 57 movably provided through a leaf spring 58 approximately at a bottom center of the holder bottom panel 51 for restricting the insertion of the small tape cassette 11.

The positioning plate 57 is integrally made of a sheet metal and has a pair of bent lugs 57a, 57b (positioning portions) located along a rear periphery of the holder bottom panel 51 and a V-lug 57c at the right side. The V-lug 57c is protruded upward through a hole 51f provided on the holder bottom panel 51. When the standard tape cassette 1 is mounted on the cassette holder 50, the U-lug 57c is pushed downward by the bottom of the standard tape cassette 1, so that the bent lugs 57a, 57b recedes downward against the leaf spring 58 to permit the mounting of the standard tape cassette 1 to the cassette holder 50. It should be noted that an elastic material may be used as the positioning plate 57 without using the leaf spring 58 for cost saving and high reliability because of its integral structure.

Further, the holder bottom panel 51 is provided with a low profile tab 51g which protrudes upward to prevent the standard tape cassette 1 or the small tape cassette 11 from being wrongly oriented and inserted to the cassette holder 51.

The holder side panels 52, 53 are made of a resin body. The holder side panel 52 of the left side is provided with a step portion 52a at an outer side thereof and with a projection 52b projecting forward for stopping a first door 111 as described hereafter referring to FIG. 10 and FIG. 12.

Inverted L-shaped engaging levers 59, 60 having respectively hook shaped engaging portions 59a, 60a at their respective front arms and having hook shaped stoppers 59b, 60b at their respective pendent arms, are rotatably and symmetrically supported by the guide pins 55b, 56b fixed on both outsides of the holder side panels 52, 53. These engaging levers 59, 60 are biased clockwise (C1 direction) by tension springs 61, 62, but the rotations of the engaging levers 59, 60 are restricted by the stoppers 59b, 60b which abut on the back rims of the right and left side panels 52 and 53. The engaging levers 59, 60 are further provided in proximity to the hooks 51d, 51d respectively with positioning parts 59c, 59c (illustrated only the left one). The positioning parts 59c and 59c are formed on the respective pendent arms of the engaging levers 59, 60 as such that respective distal ends of the pendent arms are bent inward at bottoms of the holder side panels 52, 53 to form bent portions, and the positioning parts 59c, 59c are erected upward from the respective bent portions. Functions and operations of the hook shaped engaging portions 59a, 60a are described hereafter referring to FIG. 7.

As mentioned in the foregoing, the holder ceiling panel 54 is made of a sheet metal, and is provided with many functional members operating in cooperation with a cassette holder positioning mechanism 30 (described hereafter referring to FIG. 7), however, the description is only given to the construction of the functional members here, and the description of the operation thereof will be given thereafter.

As illustrated in FIG. 6, the holder ceiling panel 54 is provided with stopper nails 54a1, 54a2 erected upward nearby both sides of a front end of the holder ceiling panel 54, and with passing holes 54b1 through 54b3 therein, and further with stoppers 54c1, 54c2 protruding backward from a rear end thereof.

A pair of Z-shaped lock levers 63, 63 each having front and rear arms are rotatably provided on shafts 64, 64 on a reverse side of the holder ceiling panel 54 for holding the cassette holder 50 at the second mounting and taking-out position when the small tape cassette 11 is not mounted in the cassette holder 50 in cooperation with the cassette holder positioning mechanism 30. The Z-shaped lock lever 63 comprises an engaging portion 63a protrusively provided downward from the rear arm of the Z-shaped lock lever 63 and a lock portion 63b protrusively provided upward through the front arm of the Z-shaped lock lever 63 in such a manner that a part of the lock portion 63b protrudes upward through the passing hole 54b1 (54b2). The Z-shaped lock lever 63 is biased by a tension spring 65 in the counterclockwise direction (the arrow D1 direction) around the shaft 64 causing the base of the engaging portion 63a to engage with the bottom of the holder ceiling panel 54.

When the engaging portion 63a is pushed upward by the small cassette 11 upon its insertion, the lock lever 63 is rotated clockwise (the arrow D2 direction), so that the lock portion 63b swings downward, and is disengaged from the cassette holder positioning mechanism 30 to permit the cassette holder 50 to be moved toward the second cassette holding position, as described hereafter Further, a push arm 67 having a roller 66 at a distal end thereof is rotatably provided on a shaft 69 at the center of the reverse side of the holder ceiling panel 54 in such a manner that the push arm 67 is biased downward by a coil spring 68 so as to push down the standard tape cassette 1 or the small tape cassette 11 toward the holder bottom panel 51 with the roller 66.

Further, under the holder ceiling panel 54, a 2-leg gate (arm member) 70 is rotatably supported by shafts 71a and 71b for guiding the insertion of the small tape cassette 11.

The 2-leg gate 70 generally comprises a back lib 70a and a pair of arm members 70b, 70c extending obliquely downward from the back lib 70a. The shafts 71a, 71b extended from the arm members 70b, 70c are fixed to the holder side panels 52, 53. The 2-leg gate 70 is biased in the arrow E1 direction by a tension spring 72 one end of which is fixed to a distal end 70a1 of the back lib 70a and the other end is fixed to the holder side panel 52 causing the back lib 70 to engage with an end portion 73b of a lever 73 which is rotatable clockwise from the position illustrated by being supported on a shaft 73c.

When the small cassette 11 is inserted into the cassette holder 50, the small cassette 11 is guided by the arm members 70b, 70c therebetween because a space between arm members 70b, 70c is approximately equal to the width X2 of the small tape cassette 11 (FIG. 3B) to permit the insertion of the small tape cassette 11 therebetween.

On the other hand, when the standard tape cassette 1 is mounted on the cassette holder 50, the arm members 70b, 70c of the 2-leg gate 70 stand on the way of insertion of the standard tape cassette 1, however, the arm members 70 b, 70c restrict upward by rotating clockwise as the other end portion 73a of the lever 73 engages with the back surface of a first door 111, as described hereafter, this enables the insertion of the standard tape cassette 11 to the cassette holder 50.

Further, a safety frame 74 extending backward from the arm members 70b, 70c is provided for restricting an excessive insertion of the small tape cassette 11 or the like into the cassette holder 50. The safty frame 74 can be rotated only in the counter-clockwise direction E1 to permit the insertion of the standard tape cassette 1 as described hereafter.

As described in the foregoing, the tab 51g is provided on the holder bottom panel 51 for preventing the tape cassette 1 or 11 of wrong orientation from being inserted, however, it is not good enough because the distance between the holder ceiling panel 54 and the holder bottom panel 51 is made larger than that of the height Z1 or Z2 of the standard tape cassette 1 or the small tape cassette 11 to provide many functional members mentioned in the foregoing on the bottom of the holder ceiling panel 54, which is liable to permit an irregular insertion or an excessive insertion of the small cassette 11, though the push arm 67 having the roller 66 is provided to press down the tape cassette 1 or 11 the holder bottom panel 51.

According to the present invention, however, the safety lever 74 of the present invention can securely prevent the tape cassette 1 or 11 from being irregularly or excessively inserted into the cassette holder 50 by causing the distal end of the standard tape cassette 1 or the small tape cassette 11 to catch the salty frame 74 when the small tape cassette 11 is irregularly inserted into the cassette holder 50 or when the standard tape cassette 1 or the small tape cassette 11 is wrongly oriented and inserted, i.e., a short side of the standard tape cassette 1 or the small tape cassette 11 is headed toward the cassette holder 50. Thus, reliability and quality of the apparatus are secured.

Furthermore, a lid opening lever 75 is provided under the passing hole 54b3 on the bottom of the holder ceiling panel 54 for opening the lid 15 of the small tape cassette 11 (FIG. 3B). The lid opening lever 75 opens the lid 15 in cooperation with a cam portion (not shown) provided on the holder ceiling 43 (FIG. 4) by the transfer of the cassette holder 50. Upon the mounting of the standard tape cassette 1, the lid opening lever 75 rotatably retreats to permit the insertion of the small tape cassette 11 by being pushed by the top of the standard tape cassette 1, but the detailed description of it is omitted for simplicity here.

Cassette holder positioning mechanism 30

FIG. 7A is a perspective view showing a cassette holder positioning mechanism in a state where the cassette holder positioning mechanism is positioned at a first mounting and taking-out position for the standard tape cassette 1. FIG. 7B is a perspective view showing the holder positioning mechanism in a state where the cassette positioning mechanism is positioned at a second mounting and taking-out position for the small tape cassette 11.

As described in the foregoing, the depth Y2 of the small tape cassette 11 is shorter than that of the standard tape cassette 1, so that it is difficult for the small tape cassette 1 to be inserted deeper into or to be taken-out from the cassette holder 50 at the first mounting and taking-out position for the standard tape cassette 1.

In the present invention, to eliminate this difficulty, there provided the second mounting and taking-out position for the small tape cassette, which is located forward of the first mounting and taking-out position, provided also is a cassette holder positioning mechanism 30 for selectively positioning the cassette holder 50 at the first mounting and taking-out position or at the second mounting and taking-out position.

Referring to FIG. 7A, upon mounting the standard tape cassette 1 in the cassette holder 50, and when the indication "standard type" is selected with the cassette selection switch 26, the loading poles 24, 25 are transferred to the first loading start position as described in the foregoing. At that time, a distal end 28a of the control plate 28 is positioned at a left position (the arrow direction A2).

On the other hand, the Z-shaped cassette holder switch lever 32 of the cassette holder positioning mechanism 30 is rotatably provided on the shaft 31a which is supported by projections 42d, 42e formed apart on an outer side of the right side panel 42. Further, guide pins 41f1 and 42f1 are respectively provided in recesses 41f and 42f formed on the respective upper sides of both left and right side panels 41 and 42. A cassette holder position switch panel 33 having guide slots 33a, 33b at both ends thereof is slidably provided in such a manner that guide slots 33a, 33b are fitted over the guide pins 41f1, 42f1. Further, the cassette holder position switch lever 33 is provided with a hole 33c at the right distal end thereof, bent lugs 33d, 33e at both sides thereof extending backward, stoppers 33f, 33g bent downward and twisted inward, and L-shaped tabs 33h, 33i protruding backward from a rear rim of the switch plate 33.

Referring to FIG. 7A, the cassette holder switch lever 32 is rotatably biased in the counter-clockwise direction F1 by a coil spring 31c but restricted to be rotated by causing a distal end 32a1 of a lower arm 32a thereof to engage with an end portion 28a of the control plate 28 which is shifted to the left side. A connection part 32b1 bent upward at a distal end of an upper arm 32b of the cassette holder switch lever 32 is slidably inserted into a slot 33c provided in the cassette holder switch lever 33, so that the the cassette holder switch plate 33 is pulled in the direction A1 to be positioned at a first position corresponding to the first mounting and taking-out position, by the rotation of the upper arm 32b in the direction F1.

Figure 11A:
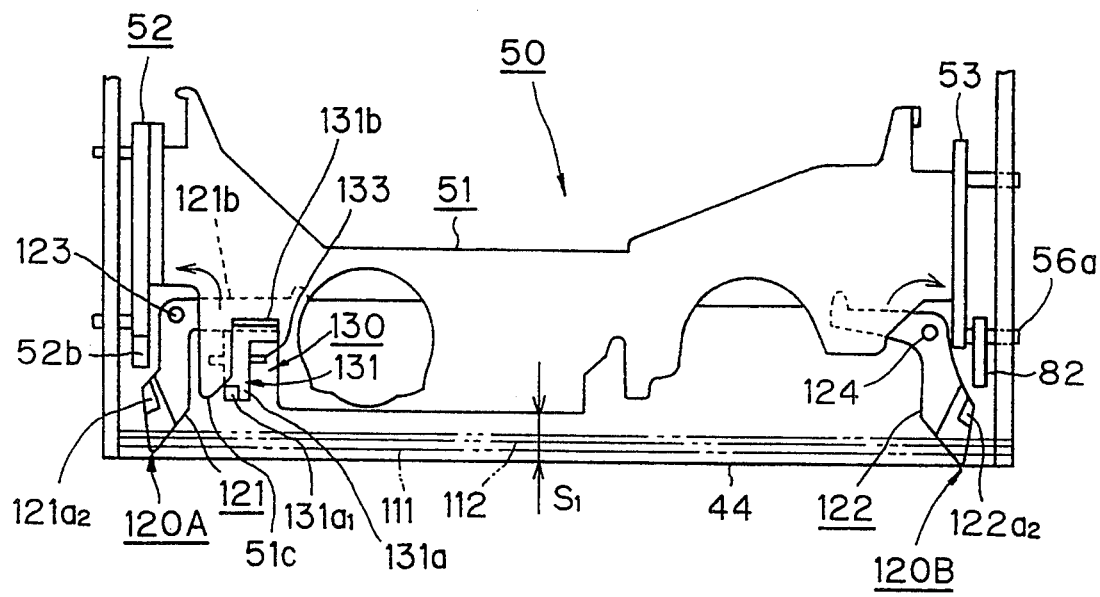
FIG. 11A is a plan view showing a first mounting and taking-out position.

In the above state, when the cassette holder 50 is transferred in the direction B2, the cassette holder 50 is restricted to be transferred by causing the stopper nails 54a1, 54a2 of the cassette holder 50 to engage with the stoppers 33f, 33g of the cassette holder switch plate 33. At that time. interlocking hooks 59a, 60a of the the engaging levers 59, 60 provided at the holder side panels 53, 53 (FIG. 6) are engaged with the bent lugs 33d, 33e of the cassette holder switch plate 33, so that the cassette holder 50 is held at this position, i.e., the first mounting and taking-out position. Further, lock portions 63b, 63b of the lock levers 63, 63 provided on the bottom of the holder ceiling panel 54 is engaged with the L-shaped tabs 33h, 33i of the cassette holder switch lever 33, so that the lock portions 63b, 63b are pushed downward and engage portions 63a, 63a are rotated upward, of which operation is described hereafter. Therefore, the cassette holder 50 is securely positioned to the first mounting and taking-out position to permit the insertion of the standard tape cassette 1, wherein the distance from the front panel 44 to the the holder bottom panel 51 is defined as S1 as shown in FIG. 11A.

The disengagement of interlocking hooks 59a, 60a of the engaging lever 59, 60 from bent lugs 33d, 33e of the cassette holder switch plate 33 can be performed by the insertion of the standard tape cassette 1 as follows.

Referring to FIGS. 6 and 7A, when the standard tape cassette 1 is inserted into the cassette holder 50 at the first mounting and taking-out position, the loading edge of the standard tape cassette 1 is engaged with the positioning parts 59c, 60c of the engaging levers 59, 60 and engaging levers 59, 60 are rotated counterclockwise around guide pins 55b, 56b, so as to disengage the engaging parts 59a, 60a from bent the lugs 33d, 33e of the cassette holder positioning plate 33, so that the cassette holder 50 can be transferred in the arrow direction B1 hereafter.

Referring to FIG. 7B, when the indication "small type" is selected by the cassette selection switch 26 at a state where the standard tape cassette 1 is not mounted in the cassette holder 50 at the first mounting and taking-out position, the loading poles 24, 25 are transferred to the second loading start position, as described in the foregoing, and the control plate 28 is displaced in the arrow direction A1 to rotate the cassette holder switch lever 32 in the clockwise direction F2 by pushing the distal end 32a1 of the switch lever 32, so that the cassette holder position switch plate 33 is displaced to, in the arrow direction A2, the second mounting and taking-out position to disengage the stoppers 33f, 33g from the stopper nails 54a1, 54a2 of the cassette holder 50, so that the cassette holder can be transferred in both the arrow direction B1, B2 hereafter, thus the cassette holder 50 can be positioned at the second mounting and taking-out position.

As clearly understood from the above description the positioning device for positioning the cassette holder 50 to the first mounting and taking-out position comprises the first engaging members (33d, 33e, 33f, 33g) provided on the cassette holder position switch plate 33 and the first engaged members (54a1, 54a2, 59, 60) provided on the cassette holder 50.

Next, referring to FIG. 7B again, when the indication "small type" is selected with the cassette selection switch 26, the cassette holder position switch plate 33 is displaced to, in the arrow direction A2, the second position corresponding to the second mounting and taking-out position as described in the foregoing.

In the above state, when the cassette holder 50 is transferred in the arrow direction B2, the cassette holder 50 can be positioned to the second mounting and taking-out position which is closer to the front side than the first mounting and taking-out position without engaging the stopper nails 54a1, 54a2 with stoppers 33f, 33g provided on the cassette holder position switch plate 33, whereby lock levers 63, 63 provided on the holder ceiling panel 54 are rotated in the counter-clockwise direction by the springs 65, 65 (FIG. 6), so that engaging portions 63b, 63b thereof enter into L-shaped recesses 33h, 33i provided on the cassette holder position switch plate 33, in such a manner that engaging portions 63b, 63b protrude upward through recesses formed by the L-shaped tabs 33h, 33i. Thus, the cassette holder 50 is engaged with the cassette holder switch plate 33 and securely positioned at the second mounting and taking-out position.

Figure 12A:
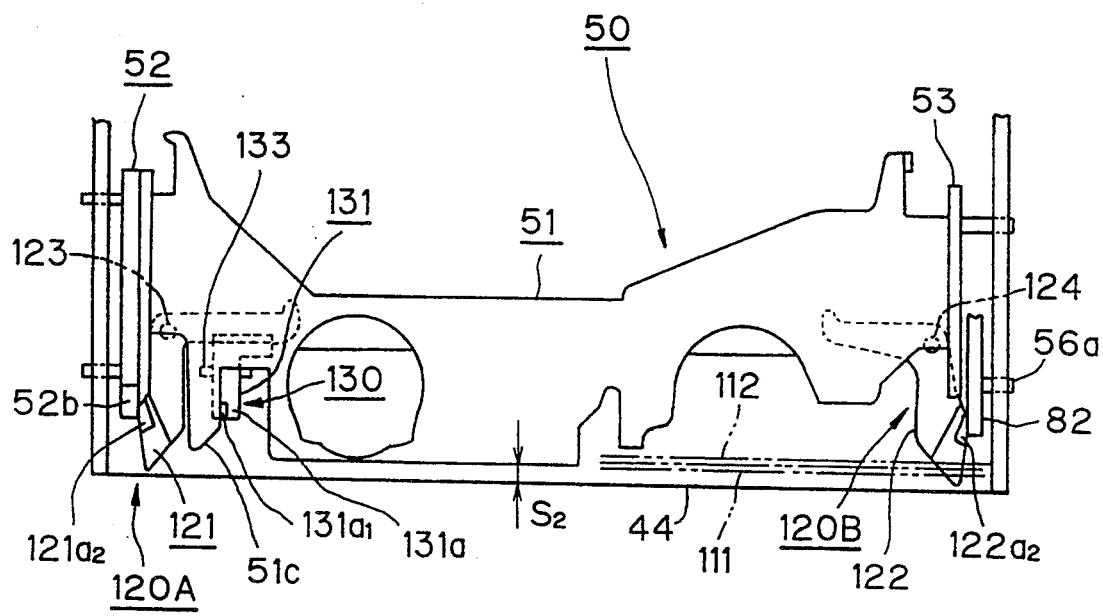
FIG. 12A is a plan view showing a second mounting and taking-out position.

When the cassette holder 50 is positioned at the second mounting and taking-out position, the distance between the front panel 44 and the holder bottom panel 51 is defined as S2 as shown in FIG. 12A, which S2 is shorter by 8 mm than the foregoing S1 (the first mounting and taking-out position) in this embodiment. Thus, the small tape cassette 11 having a short longitudinal size Y2 can be easily inserted into or taken-out from the cassette holder 50.

The disengagement of engaging portions 63b, 63b from the L-shaped tabs 33h, 33i of the cassette holder position switch plate 33 can be performed by the insertion of the small tape cassette 11 as follows.

Referring to FIG. 7B, when the small tape cassette 11 is inserted into the cassette holder 50, the front of the small tape cassette 11 pushes upward the locking tabs 63a, 63a of lock levers 63, 63 and rotates the lock levers 63, 63 in the clockwise direction to disengage engaging portions 63b, 63b from the L-shaped tabs 33h, 33i, so that the small tape cassette 11 can be transferred in the arrow direction B1 thereafter.

Next, when the indication "standard type" is selected with the cassette selection switch 26 at the second mounting and taking-out position of the cassette holder 50 on which the small tape cassette is not mounted, the cassette holder switch plate 33 is transferred to the first position as described in the foregoing, so that the cassette holder can be transferred in the arrow direction B1 thereafter and positioned at the first mounting and taking-out position.

As clearly understood from the above description, the positioning device for positioning the cassette holder 50 to the second mounting and taking-out position comprises the second engaging members (33h, 33i) provided on the cassette holder position switch plate 33 and the second engaged members (63, 63) provided on the cassette holder 50 for being engaged with the engaging members.

It should be noted that the cassette holder 50 may be positioned in advance at the first or the second mounting and taking-out position when the cassette holder position switch plate 33 is positioned to the first or the second position with the switch 26, correspondingly, where the cassette holder 50 needs not be transferred.

Other cassette holder positioning mechanisms may be employed for driving the cassette holder position switch plate 33, for instance, a solenoid driving system by using signals from the cassette selection switch 26 instead of the mechanism of this embodiment in which the control plate 28 operates the cassette holder position switch plate 33 through the cassette holder switch lever 32 in response to the operation of the cassette selection switch 26.

Door Mechanism 100

Figure 8:
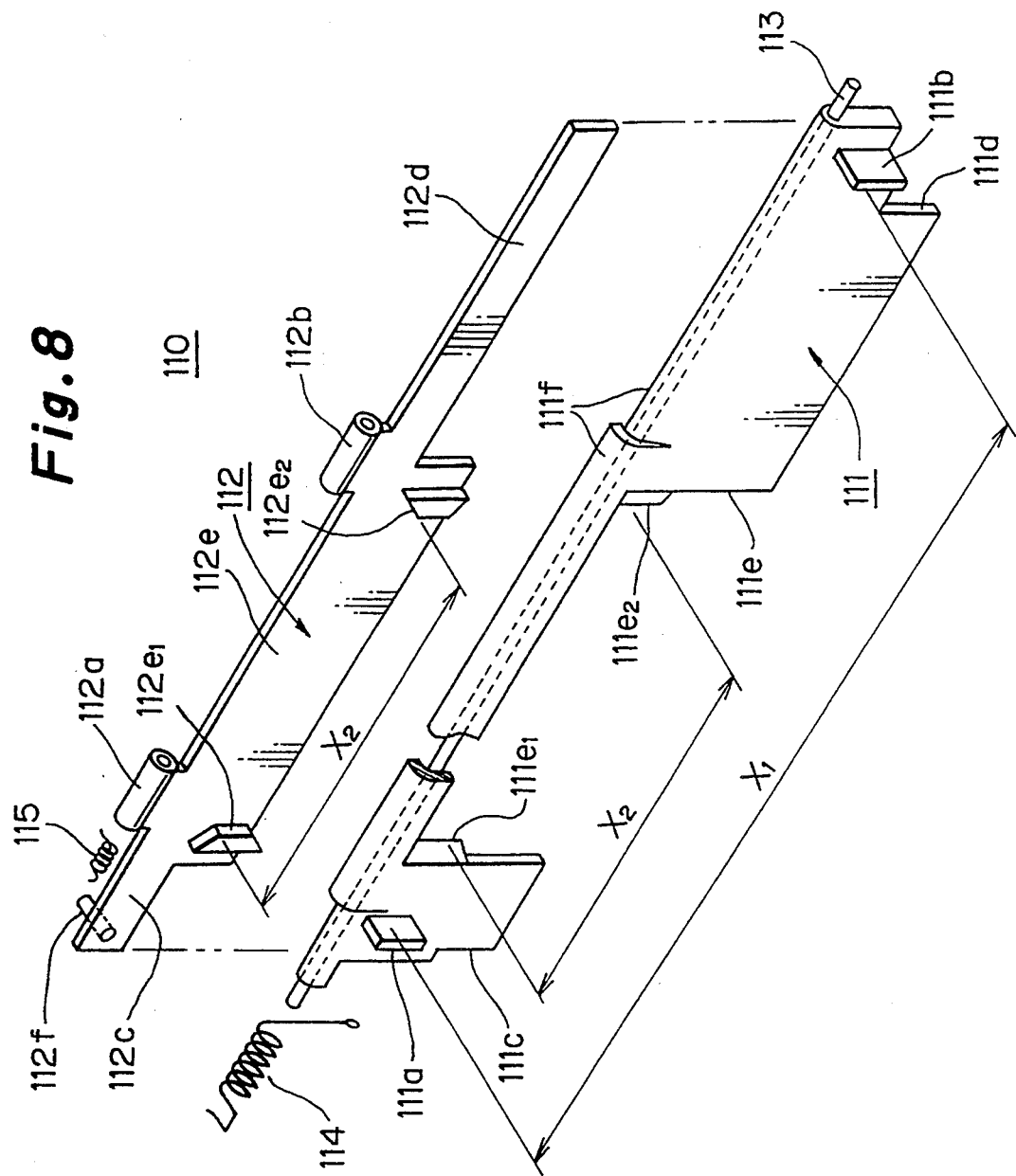
FIG. 8 is an enlarged perspective view showing a door mechanism assembly shown in FIG. 4.
Figure 9:
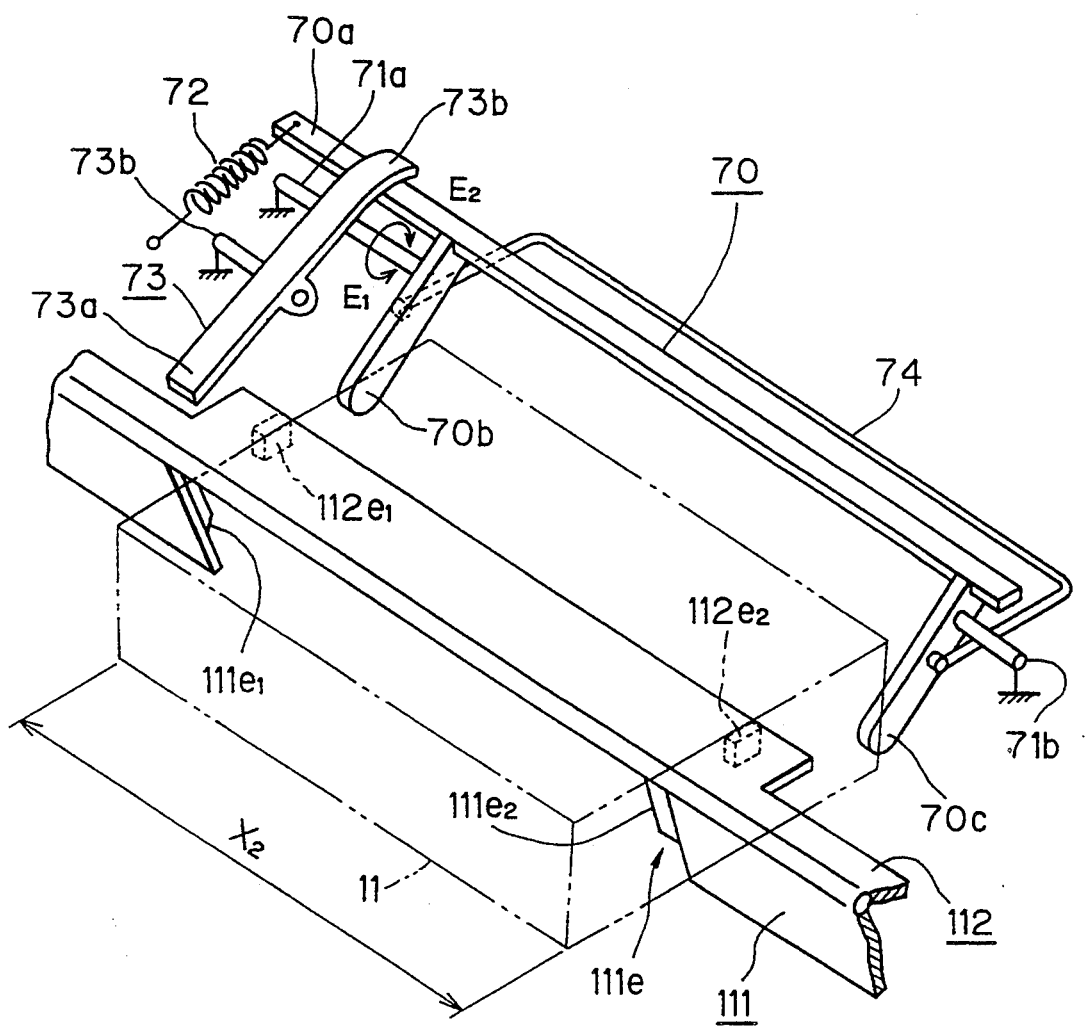
FIG. 9 is a perspective view showing a small tape cassette inserted into a cassette holder through a door mechanism.
Figure 11B:
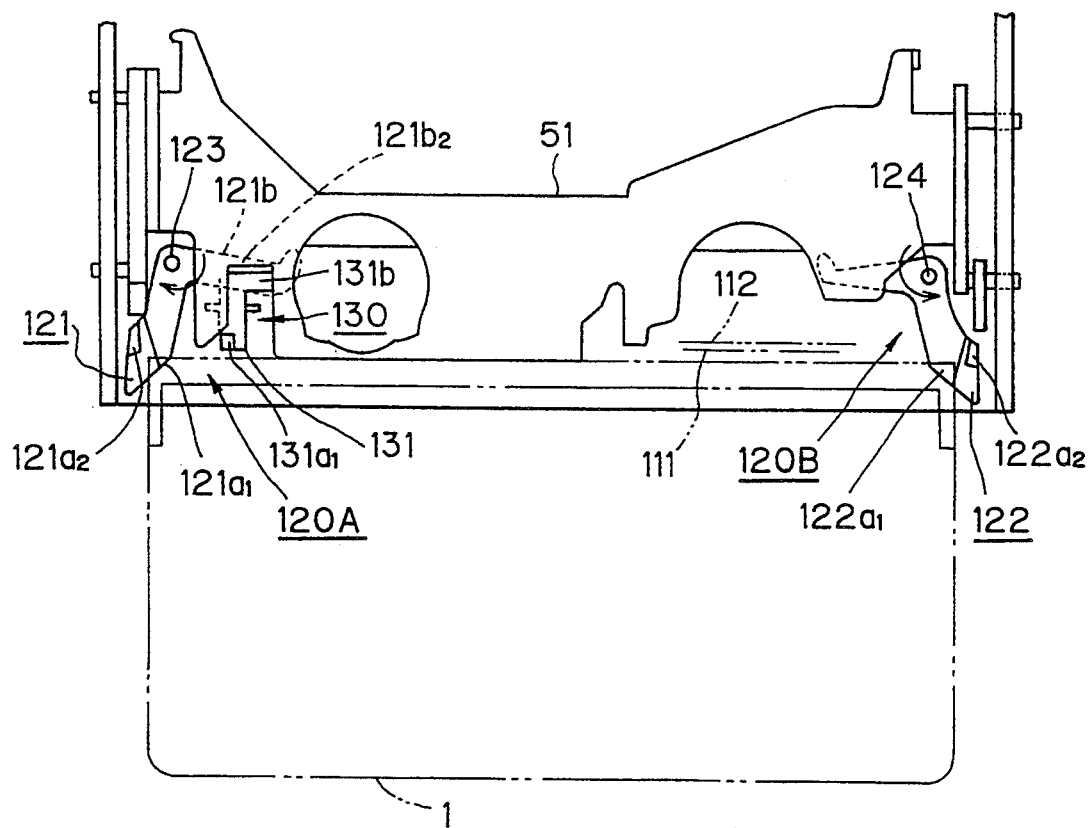
FIG. 11B is a plan view showing a state where a standard tape cassette is going to be inserted to the cassette holder through a door mechanism at the first mounting and taking-out position.
Figure 12B:
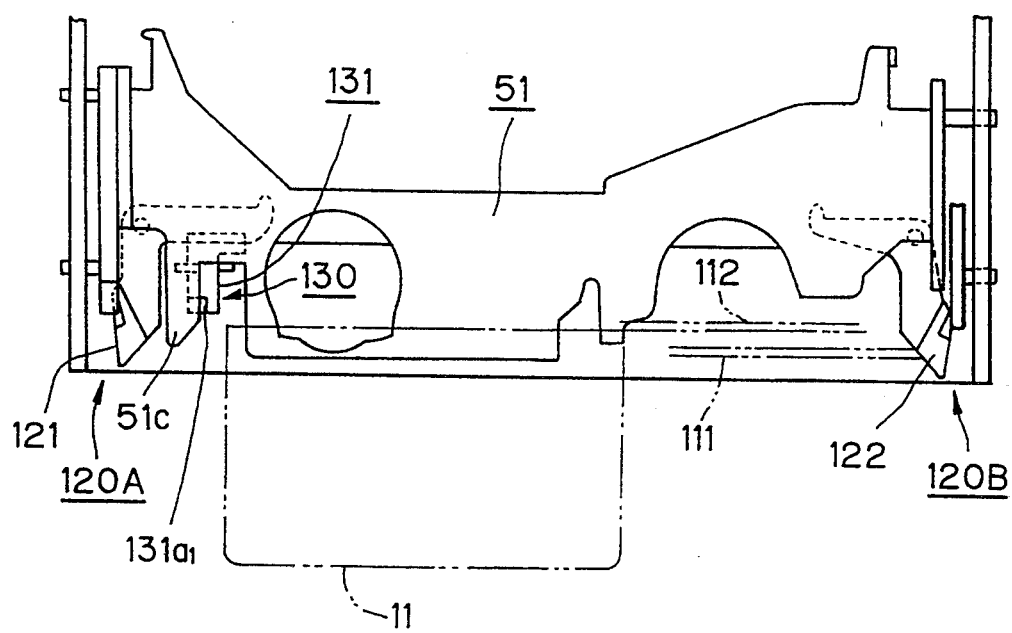
FIG. 12B is a plan view showing a state where a small cassette is intended to be going to the cassette holder through a door mechanism at the second mounting and taking-out position.

FIG. 8 is an enlarged perspective view showing a door mechanism assembly shown in FIG. 4. FIG. 9 is a perspective view showing a small tape cassette inserted into a cassette holder through a door mechanism. FIG. 10 is a perspective view showing a first door stopper and a second door stopper for stopping a first door and a second door. FIG. 11A is a plan view showing a first mounting and taking-out position, FIG. 11B is a plan view showing a state where a standard tape cassette is going to be inserted to the cassette holder through a door mechanism at the first mounting and taking-out position. FIG. 12A is a plan view showing a second mounting and taking-out position. FIG. 12B is a plan view showing a state where a small tape cassette is going to be inserted to the cassette holder through a door mechanism at the second mounting and taking-out position.

The description is given to a door mechanism 100 of the main part of the present invention referring to FIG. 4, FIG. 8, and FIGS. 10 through 12B.

The door mechanism 100 provided nearby a cassette insertion inlet 45 comprises the door portion 110 having the first and second doors 111, 112, first door stoppers 120A, 120B for stopping the first door 111 and a second door stopper 130 for stopping the second door 112.

The door portion 110 is provided between the left side panel 41 and the right side panel 42 as shown in FIG. 4, in such a manner that the first door 111 for the standard tape cassette 1 and the second door 112 for the small tape cassette 11 are rotatably provided on a shaft 113 to permit an insertion of the standard tape cassette 1 or the small cassette 11 into the cassette holder 50. The first door 111 and the second door 112 are respectively made of a separate resin body. The length of the first door 111 is formed long enough to cover the overall cassette insertion inlet 45.

Guide portions 111a, 111b are protrusively provided outward at both left and right sides of the first door 111 for guiding the standard tape cassette 1 to the cassette holder 50. The distance between the guide portions 111a and 111b is made correspondingly with the width X1 of the standard tape cassette 1 as shown in FIG. 3A. Further, cut-outs 111c, 111d are formed at both ends of the first door 111 to accept the first door stoppers 120A, 120B described hereafter. Furthermore, an opening 111e for permitting the insertion of the small tape cassette 11 is formed at a position offset toward the guide portion 111a, and guide portions 111e1, 111e2 (first guide portion) for guiding the small cassette 11 are respectively provided at both sides of the opening 111e in such a manner that the distance between the guide portions 111e1 and 111e2 is determined correspondingly with the width X2 of the small tape cassette 11 shown in FIG. 3B. A hinge portion 111f is provided at the upper end of the first door 111, which hinge portion 111f comprises a pair of cylinder at both sides and a semi-circle cylinder therebetween.

The second door 112 made of a panel for the small cassette 11 comprises a cover portion 112e for covering the opening 111e of the first door 111, a pair of bearings 112a, 112b in a front cylinder at the upper end thereof, a pair of guide portions (second guide portion) 112e1, 112e2 protrusively provided on the cover portion 112e at an interval of X2 corresponding to the width of the small cassette 11 for guiding the small tape cassette 11.

The second door 112 is rotatably mounted on the shaft 113 just behind the first door 111 in such a manner that the bearings 112a, 112b is inserted into the shaft 113 and placed inside of the semi-circle cylinder of the hinge portion 111f. A coil spring 114 is provided on the shaft 113 so as to rotate the first door 111 in the clockwise direction by causing one end of the coil spring 114 to engage with an engaging part of the first door 111 and the other end thereof to engage with the side panel 41, however, the rotation of the second door 112 in the clockwise direction is restricted by stoppers 41g, 42g shown in FIG. 4. A coil spring 115 is also provided on the shaft 113 so as to rotate the second door 112 in the clockwise direction by causing one end of the coil spring 115 to engage with the first door 111 and the other end thereof to engage with the second door 112, however the rotation of the second door 112 in the clockwise direction is restricted by the first door 111.

When the standard tape cassette 1 is inserted into the cassette holder 50 through the first door 111 along the first guide portions 111a, 111b, the first door 111 together with the second door 112 is pushed and rotated in the counter-clockwise direction to open by the standard tape cassette 1 in cooperation with a disengaging mechanism of the first door stoppers 120A, 120B and the second door stopper 130 which will be described hereafter.

On the other hand, referring to FIG. 9, when the small cassette 11 is inserted into the cassette holder 50 through the second door 112 along the guide portions 111e1, 111e2 provided beside the opening 111e and the guide portions 112e1, 112e2 provided on the second door 112, the second door 112 is pushed and rotated in the counter-clockwise direction to open by the entering small tape cassette 11 because the second door stopper 130 is only disengaged as described hereafter. When the small tape cassette 11 is further inserted inward along the guide portions 111e1, 111e2, 112e1 and 112e2, the small cassette 11 is restricted in motion and securely positioned to the second loading start position by being engaged with the 2-leg gate 70 between arm members 70b, 70c thereof.

As illustrated in FIG. 4, a door opening detection lever 46 is rotatably provided on a shaft 47 on the projection 42d formed on the right side panel 42 in such a manner that a distal end 46a of the door opening detection lever 46 is rotated in the counter-clockwise direction by the weight itself and positioned just behind the second door 112 by causing the door opening detection lever 46 to engage with a stopper (not shown) provided on the right side panel 42. A detector 48 such as photosensor is provided nearby the other distal end 46b of the door opening detection lever 46 on the right side panel 42 to detect if the doors 111, 112 are opened or not by detecting the position of the other distal end 46b with respect to the detector 48.

When the first door 111 together with the second door 112 or solely the second door 112 is rotated in the counter-clockwise direction to open by the insertion of the standard tape cassette 1 or the small tape cassette 11, the door opening detection lever 46 is rotated in the clockwise direction because the distal end 46a thereof is pushed upward by the back surface of the second door 112, so that the detector 48 can detect the opening motion of the doors 111, 112 by detecting if the other distal end 46b of the door opening detection lever 46 is located or not.

Next, description is given to first door stoppers 120A, 120B for engaging with the first door 111 and a second door stopper 130 for engaging with the second door 112 referring to FIG. 10.

The first door stoppers 120A, 120B are respectively and symmetrically provided in left and right recesses 44a, 44b formed close to the sides of the front panel 44 facing each other.

The first door stoppers 120A, 120B respectively comprise first engaging levers 121, 122 having a V-shaped configuration and shafts 123, 124 on which the first engage levers 121. 122 are rotatably provided. The first engaging levers 121, 122 having front arms 121a, 122a and rear arms 121b, 122b are symmetrically facing each other. The first engaging lever 121 at the left side is biased counterclockwise by a spring (not shown) and restricted to rotate in the counter clockwise direction by causing the front arm 121a which is positioned within the cut-out 111c shown in FIG. 8 to engage with the inner wall of the recess 44a. The first engage lever 122 at the right side is biased clockwise by another spring (not shown) and restricted to rotate in the clockwise direction by causing the front arm 122a which is positioned within the cut-out 111d shown in FIG. 8 to engage with the inner wall of the recess 44b.

The first engaging levers 121, 122 further comprise respectively guide portions 121a1, 122a1 respectively formed on inner side surfaces of front arms 121a, 122a for guiding the standard tape cassette 1, engaging portions 121a2, 122a2 respectively formed on upper surfaces of the front arms 121a, 122a at positions slightly apart from the back surface of the first door 111 and projections 121b1, 122b1 protrusively backward provided on distal ends of rear arms 121b, 122b.

Engaging portions 121a2, 122a2 are provided for preventing the first door 111 from opening by engaging with the back surface of the first door 111 as described hereafter, but engaging portions 121a2, 122a2 permit the first door 111 to open slightly (opening angle; about 27°) because engaging portions 121a2, 122a2 are provided at the position slightly apart from the back surface of the first door 111, which facilitates the mounting and taking-out operation of the small tape cassette 11.

Referring to FIG. 10, the rear arm 121b of the first engaging lever 121 at the left side is provided with a tapered surface 121b2 of which the front side is formed lower than the rear side thereof.

On the other hand, the projection 52b provided on the holder side panel 52 (left) and the bifurcated arm 82 engaged with the guide pin 56a of the holder side panel 53 are arranged to move forward besides outer sides of the first engaging levers 121, 122 respectively and restrict the rotation of the first engaging levers 121, 122 caused by transferring operation of the cassette holder 50, as described hereafter.

Further, a second engaging lever 131 of a second door stopper 130 is rotatably provided on a shaft 132 in the recess 44a formed in the front panel 44 for preventing the second door 112 from opening in such a manner that a first front end 131a of the second engaging lever 131 is biased in the upward direction by a coil spring 133 so as to engage with the back surface of the second door 112 and prevent the second door 112 from opening by causing a rear end 131b of the second engaging lever 131 to engage with the tapered surface 121b2 of the first engaging lever 121. The second engaging lever 131 is further provided with a second front end 131a1 at the left side thereof. The second front end 131a1 has a tapered top surface, inclined downward toward its rear.

The second engaging lever 131 is disengaged from the second door 112 when the front end 131a of the second engage lever 131 is moved downward caused by rotating the first lever 121 in the clockwise direction or by causing the second front end 131a1 to engage with the projection 51c of the cassette holder 50 as described hereafter, this enables the second door 112 being opened.

A lid opening lever 141 is provided nearby the outside of the the first engaging lever 121 for opening forcibly the first door 111 or the second door 112 when the first tape cassette 1 or the small tape cassette 11 is ejected from the tape cassette loading system. The lid opening lever 141 is operated by a well-known forcible door opening mechanism in cooperation with the bifurcated arm 81, however, a detailed description is omitted for simplicity.

Next, the description is given to the operation of the door portion 110.

Referring to FIG. 11A, the cassette holder 50 is positioned at the first mounting and taking-out position (for the standard tape cassette 1) which is located further inward than the second mounting and taking-out position (for the small tape cassette 11).

In the above state, the projection 52b of the cassette holder 50 and the bifurcated arm 82 provided at the holder side panel 53 are respectively positioned closed to the outsides of the first engaging levers 121, 122, and front distal ends of the first engaging levers 121, 122 are positioned in cut-outs 111c, 111d of the first door 111 shown in FIG. 8, wherein engaging portions 121a2, 122a2 of first engaging levers 121, 122 are positioned just behind the back surface of the first door 111 to prevent the first door 111 from opening. Further, the projection 51c of the cassette holder 50 is positioned over the tapered surface of the second front end 131a1, but is not engaged with the second front end 131a1 of the second engaging lever 131, so that the second door portion 112 is prevented from opening. As shown in FIG. 11B, when the standard tape cassette 1 is inserted through the first door 111 along guides 121a, 122a2 and 111a, 111b of the first engaging levers 121, 122 and the first door 111 (FIG. 8), first engaging levers 121, 122 are respectively rotated in the counter-clockwise direction and in the clockwise direction around shafts 123, 124 against springs (not shown), so that engaging portions 121a2, 122a2 are disengaged from the back surface of the first door 111 to permit the insertion of the standard tape cassette 1. In other wards, the first door 111 is disengaged from first door stoppers 120A, 120B and permitted to open in cooperation with the insertion of the standard tape cassette 1.

At the same time, the tapered surface formed on the rear arm 121b of the first engaging lever 121 moves forward by the rotation of the first engaging lever 121, so that the rear distal end 131b of the second engaging lever 131 of which the bottom is engaged with the tapered surface is pushed upward and rotates the second engaging lever 131 in the counter clockwise direction around the shaft 132 against the coil spring 133 shown in FIG. 10. Therefore, the front distal end 131a together with the second front end 131a1 moves downward to permit the opening of the second door portion 112. Accordingly, the second door 112 is disengaged from the second door stopper 130 in cooperation with the rotation of the first engaging lever 121.

Thus, the first door 111 together with the second door portion 112 is permitted to open by the insertion of the standard tape cassette 1.

It should be noted that when the small tape cassette 11 is inserted from the second door 112 by mistake, the front distal end 131a securely prevents the second door 112 from opening.

Next, referring to FIG. 10 and FIG. 12A, the cassette holder 50 is positioned at the second mounting and taking-out position (for the small tape cassette 11) which is located further forward than the first mounting and taking-out position (for the standard tape cassette 1).

In the above state, the bottom of the projection 51c of the cassette holder 50 is engaged with the tapered surface of the second front end 131a1 of the second engaging levers 131 in such a manner that the second front end 131a1 is pushed downward by the projection 51c against the coil spring 133 shown in FIG. 10 to be disengaged from the back surface of the second door. Accordingly, the second door 112 is disengaged from the second door stopper 130 to permit the opening of the second door 112 in cooperation with an advancement of the projection 51c of the cassette holder 50. Further, the projection 52b of the cassette holder 50 and the bifurcated arm 82 provided at the holder side panel 53 are respectively positioned along the outsides of the first engaging levers 121, 122, so that first engaging levers 121, 122 are respectively prevented from rotating both in the clockwise and counter-clockwise directions.

Therefore, the first door 111 is prevented from opening by causing the back surface of the first door to engage with engaging portions 121a2, 122a2 of the first engaging levers 121, 122. In other words, the first door 111 is engaged with the first door stoppers 120A, 120B in cooperation with engaging portions 121a2, 122a2 of the first engaging levers 121, 122 and the bifurcated arm 82.

As shown in FIG. 12B, when the small tape cassette 11 is inserted through the second door 112 along the guides 111e1, 111e2 and 112e1, 112e1 of the first door 111 and the second door portion 112 (FIG. 8), the second door 112 is opened by the small tape cassette 11 except the first door 111 because the front distal end 131a together with the second front end 131a1 is moved downward to permit the second door 112 to open and the back surface of the first door 111 is engaged with the engaging portions 121a2, 122a2 of the first engaging lever 121 to prevent the first door 111 from opening. Accordingly, at the second mounting and taking-out position, the second door 112 is able to be opened and the first door 111 is prevented from opening.

It should be noted that when the standard tape cassette 1 is inserted through the first door 111 by mistake, engaging portions 121a2, 122a2 of the first engaging lever 121 securely prevents the first door 111 from opening.

The operation of the tape cassette loading system

The description is given to the operation of the tape cassette loading system referring to FIG. 13A, 13B.

FIG. 13A is a side elevation view showing a loading operation of a standard tape cassette 1. FIG. 13B is a side elevation view showing a loading operation of the small cassette 11.

In FIG. 13A, the cassette holder 50 is positioned at the first mounting and taking-out position and the loading poles 24, 25 are positioned at the first loading start position. When the standard tape cassette 1 is mounted through the first door 111 on the cassette holder 50, the first door 111 is opened together with the second door 112 to permit the insertion of the standard tape cassette 1. After that, the cassette holder 50 is transferred in the direction of the arrow B1 along L-shaped grooves 42a, 42b by the cassette holder driving mechanism 80 shown in FIG. 5 in response to a signal from the detector 48 shown in FIG. 4, and is positioned at the first cassette holding position as illustrated with two dot chain lines by first positioning pins 271, 272 described hereafter referring to FIG. 14, where the loading poles 24, 25 enter the openings 2b1, 2b2 of the standard tape cassette 1 to intercept and engage with the magnetic tape T to draw it out of the standard tape cassette 1, subsequently, the loading poles 24, 25 move respectively to predetermined position so as to bring the magnetic tape T obliquely around the rotary drum 23. Then, recording or reproducing of signals on or from the tape T is performed by the rotary magnetic heads 22 provided on the rotary drum 23.

In FIG. 13B, the cassette holder 50 is positioned at the second mounting and taking-out position and the loading poles 24, 25 are positioned at the second loading start position. When the small tape cassette 11 is mounted through the first door 111 on the cassette holder 50, the only second door 112 is opened to permit the insertion of the small tape cassette 11. After that, the cassette holder 50 is transferred in the directly on of the arrow B1 along L-shaped grooves 42a, 42b by the cassette holder driving mechanism 80 shown in FIG. 5 in response to a signal from the detector 48 shown in FIG. 4, and is positioned at the second cassette holding position as illustrated with two dot chain lines by second positioning pins 275, 276 described hereafter referring to FIG. 14 and FIG. 15.

In this state, the first door 111 is permitted to open a slightly (at the opening angle 27°) so as to facilitate the mounting or taking-out operation of the small tape cassette 11 as described in the foregoing, however, a complete opening of the first door 111 is prevented by causing the back surface of the first door 111 to engage with the engaging potions 121a2, 122a1 of the first door stoppers 120A, 120B shown in FIG. 10. to securely prevent the standard tape cassette 1 from being inserted through the first door 111 by mistake. Other description regarding similar operations regarding the standard tape cassette 1 is omitted for simplicity.

Positioning mechanism

Next, the description is given to the positioning mechanisms of the standard tape cassette 1 and the small tape cassette 11.

Figure 15:
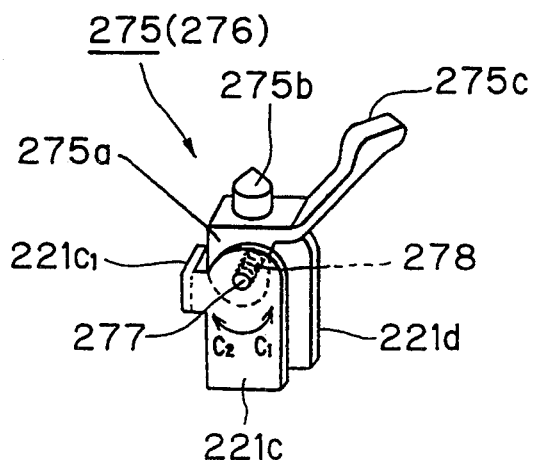
FIG. 15 is a perspective view showing a second positioning pin for a small tape cassette.

FIG. 14 is a perspective view showing a cassette positioning device. FIG. 15 is a perspective view showing a second positioning pin 275 for a small tape cassette.

Referring to FIG. 14, a pair of first positioning pins 271, 272 and a pair of first holding pins 273, 274 for the standard tape cassette 1 are respectively provided on an area where the standard tape cassette 1 is to be loaded, besides, where the small tape cassette 11 is not to be loaded in the chassis base 21 for positioning and holding the standard tape cassette 1 at the first cassette holding position.

The above first positioning pins 271, 272 respectively comprise tapered pins 271a, 272a which are inserted into the positioning holes 2a1, 2a2 provided on the bottom of the standard tape cassette 1 shown in FIG. 3A at the first cassette holding position. On the other hand, the above first holding pins 273, 274 respectively comprise a flat surface at the top thereof to hold the bottom of the standard tape cassette 1 at the first cassette holding position.

Thus, the pair of first positioning pins 271, 272 and the pair of first holding pins 273, 274 can securely position the standard tape cassette 1 at the first cassette set position without disturbing the loading of the small cassette 11.

A pair of second positioning pins 275 and 276 for the small tape cassette 11 are rotatably provided on shafts 277 and 277 supported at lugs 221c, 221d and 221e, 221f on the chassis base 21.

As illustrated in FIG. 15, the second positioning pin 275, for instance, integrally formed by a resin body comprises a holder 275a, a tapered pin 275b protrusively provided on the top of the holder 275a, a lever 275c protrusively provided in an obliquely upward direction on the upper side of the holder 275a. The holder 275a is rotatably supported by the lugs 221c, 221d with the shaft 277 and is biased by a coil spring 278 in the counter-clockwise direction (an arrow C1) in such a manner that the tapered pin 275 holds upright by causing the side of the holder 275a to engage with a stopper 221c1 provided on the lug 221c. The second positioning pin 276 on the left has the same construction as the above second positioning pin 275 on the right.

The pair of second positioning pins 275 and 276 are located symmetrically facing each other in an area where the small tape cassette 11 is to be loaded, and the tapered pins 275b and 276b are respectively located in positions corresponding to the positioning holes 12b1 and 12b2 provided on the bottom of the small tape cassette 11 to permit insertion thereof into the positioning holes 12b1, 12b2 so as to position the small tape cassette 11 at the second cassette holding position.

A second holding pin 281 for the small tape cassette 11 is provided at a front end 280a of a lever 280 which is rotatably provided on a shaft 279 nearby the first positioning pin 272 between guide grooves 21a and 21b on the chassis base 21. The lever 280 is biased in the counter-clockwise direction by a spring (not shown) and so as to be displaced to a retracted position illustrated with 2 dot chain lines by causing the lever 280 to engage with a stopper 282, where the lever 280 is inserted into the opening 2b1 of the standard tape cassette 1 without disturbing the loading of the standard tape cassette 1 when the standard tape cassette 1 is positioned at the first cassette holding position.

When the small tape cassette 11 is loaded at the second cassette holding position, the loading pole 25 is transferred to the second loading start position as described in the foregoing, so that the lever 280 is rotated in the clockwise direction D2, and the second holding pin 281 is located in an area where the small tape cassette 11 is loaded. Thus, the second holding pin 281 can support the bottom of the small tape cassette 11 through a cutout (not shown) of the cassette holder 50 when the small tape cassette 11 is mounted at the second cassette holding position.

As clearly understood from the above description, the small tape cassette 11 can be securely positioned and supported at the second cassette holding position by second positioning pins 275, 276 and the second holding pin 281. Next, the description is given to the the operation of the cassette positioning means 280.

Figure 16A:
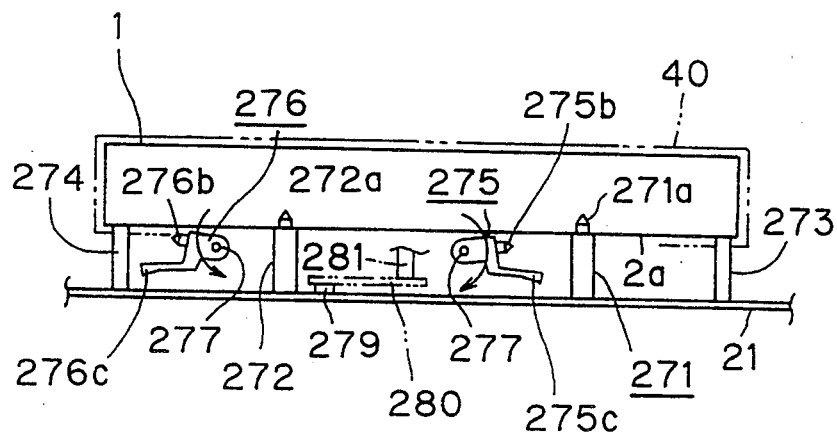
FIG. 16A is a front elevation view showing cassette positioning device when a standard tape cassette 1 is positioned at the first cassette holding position.
Figure 16B:
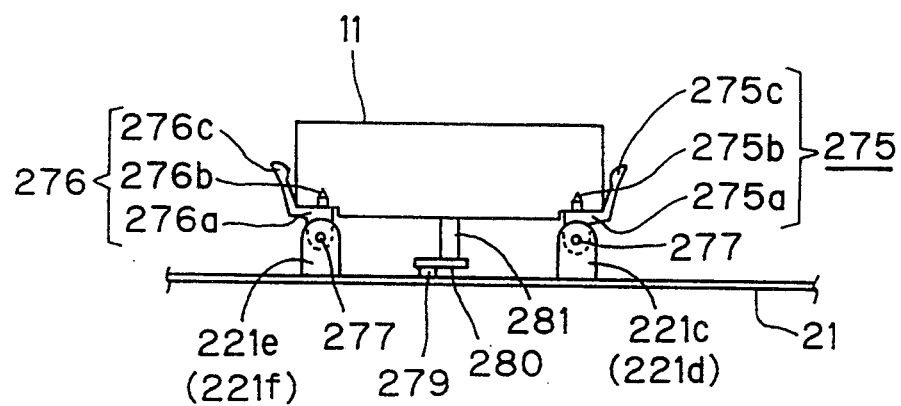
FIG. 16B is a front elevation view showing cassette positioning device when a small tape cassette 11 is positioned at the second cassette holding position.

FIG. 16A is a front elevation view showing the cassette positioning device when a standard tape cassette 1 is positioned at the first cassette holding position. FIG. 16B is a front elevation view showing cassette positioning device when a small tape cassette 11 is positioned at the second cassette holding position.

Referring to FIG. 16A, as the standard tape cassette 1 descends to the first cassette holding position, the bottom of the standard tape cassette 1 is engaged first with the distal ends of the levers 275c, 276c, subsequently, the bottom of the standard tape cassette 1 rotates the levers 275c and 276c around shafts 277 and 277 in the clockwise direction and in the counter-clockwise direction, respectively, so as to permit the standard tape cassette 1 to be loaded to the first cassette holding position, because the levers 275c and 276c are symmetrically and protrusively provided in the obliquely upward direction on the positioning pins 275 and 276 as described in the foregoing.

Thus the standard tape cassette 1 is securely positioned and held at the first cassette holding position by first positioning pins 271, 272 and first holding pins 278, 274 without being disturbed by the second positioning pins 275, 276 and the second holding pin 281.

Referring to FIG. 16B, when the small tape cassette 11 descends to the second cassette holding position, there is no obstacles in the path of the small tape cassette 11 as mentioned in the foregoing, so that the small tape cassette 11 is securely positioned and held at the second cassette holding position by second positioning pins 275, 276 and the second holding pin 281.

It is further understood by those skilled in the art that foregoing description is a preferred embodiment of the disclosed device and that various changes and modifications may be made in the invention without departing from the spirit and scope thereof.

What is claimed is:

1. A tape cassette loading system for selectively mounting and taking out one of a standard tape cassette and a small tape cassette which is smaller than the standard tape cassette in and from a cassette holder having a ceiling and a bottom, through a cassette insertion inlet and for selectively transferring one of the standard tape cassette and the small tape cassette to one of a first cassette holding position and a second cassette set position, by transferring the cassette holder respectively from a first mounting taking-out position for the standard tape cassette and a second mounting and taking-out position for the small tape cassette, whereby loading means slidably provided on a chassis base is selectively positioned at one of a first loading start position and a second loading start position correspondingly with the first cassette holding position and the second cassette holding position, said tape cassette loading system comprising:

cassette selection means for selecting and indicating one of the standard tape cassette and the small tape cassette to be mounted in the cassette holder;

a cassette holder position switch plate slidably provided nearby the cassette insertion inlet, the cassette holder position switch plate being selectively transformed to one of a first position and a second position correspondingly with the indication of the cassette selection means;

first cassette holder positioning means for positioning the cassette holder at said first mounting and taking-out position in cooperation with the cassette holder position switch plate which is positioned at the first position;

second cassette holder positioning means for positioning the cassette holder at said second mounting and taking-out position in cooperation with the cassette holder position switch plate which is positioned at the second position;

cassette holder driving means for transferring the cassette holder between said first and second mounting and taking-out positions correspondingly with said first and second set positions of the cassette holder position switch plate and shaft means provided near the cassette insertion inlet; a first door rotatably provided on the shaft means for covering said cassette insertion inlet and permitting an insertion of the standard tape cassette into the cassette holder, the first door having an opening for permitting an insertion of the small tape cassette;

a second door rotatably provided on said shaft means behind said opening for covering thereof and permitting the insertion of the small tape cassette;

a first and second engaging levers rotatably provided nearby and both sides of the cassette insertion inlet, respectively, each of the first and second engaging levers having a first engaging portion at one end thereof to engage with a back surface of the first door to prevent the first door from opening, the first engaging lever further having a tapered surface at one end thereof; and a third engaging lever rotatably provided on nearby the first engaging lever, said third engaging lever having a second engaging portion at one end thereof to engage with a back surface of the second door to prevent the second door from opening and said third engaging lever having a top surface to engage with the first tapered surface, whereby when the standard tape cassette is inserted in the cassette holder which is positioned at the first mounting and taking-out position, the first and second engaging levers are rotated by causing the standard tape cassette to engage with the first engaging portions to permit the insertion of the standard tape cassette, and the third engaging lever is also rotated and retracted in cooperation with the first engaging lever to permit the insertion of the standard tape cassette, and when the small tape cassette is inserted in the cassette holder which is positioned at the second mounting and taking-out position, the third engaging lever is rotated and retracted to permit insertion of the small tape cassette by causing said top surface of the third engaging lever to engage with the bottom of the cassette holder.

* * * * *